US008713635B2

(12) United States Patent
Iga

(10) Patent No.: US 8,713,635 B2
(45) Date of Patent: Apr. 29, 2014

(54) INFORMATION TERMINAL, SETTING INFORMATION DISTRIBUTION SERVER, RIGHT INFORMATION DISTRIBUTION SERVER, NETWORK CONNECTION SETTING PROGRAM AND METHOD

(75) Inventor: Norihisa Iga, Tokyo (JP)

(73) Assignee: NEC Corporation, Tokyo (JP)

( * ) Notice: Subject to any disclaimer, the term of this patent is extended or adjusted under 35 U.S.C. 154(b) by 1742 days.

(21) Appl. No.: 11/570,332

(22) PCT Filed: Jun. 8, 2005

(86) PCT No.: PCT/JP2005/010461
§ 371 (c)(1),
(2), (4) Date: Jul. 6, 2007

(87) PCT Pub. No.: WO2005/121981
PCT Pub. Date: Dec. 22, 2005

(65) Prior Publication Data
US 2008/0052754 A1 Feb. 28, 2008

(30) Foreign Application Priority Data
Jun. 10, 2004 (JP) ................................. 2004-172335

(51) Int. Cl.
*H04L 29/06* (2006.01)
(52) U.S. Cl.
USPC .................................. 726/3; 726/12; 709/249
(58) Field of Classification Search
USPC ............................................ 726/12; 709/249
See application file for complete search history.

(56) References Cited

U.S. PATENT DOCUMENTS

| 6,487,557 | B1 * | 11/2002 | Nagatomo | 707/102 |
| 7,068,999 | B2 * | 6/2006 | Ballai | 455/411 |
| 7,224,053 | B2 | 5/2007 | Yamamoto | |
| 7,293,108 | B2 * | 11/2007 | Warrier et al. | 709/249 |
| 7,587,485 | B1 * | 9/2009 | Chitnis et al. | 709/224 |

(Continued)

FOREIGN PATENT DOCUMENTS

| JP | 61-059762 A | 3/1986 |
| JP | 64-008652 | 1/1989 |

(Continued)

OTHER PUBLICATIONS

Buecker, "Understanding IT Perimeter Security", Jun. 9, 2008, IBM, p. 1-22.*

(Continued)

*Primary Examiner* — Taghi Arani
*Assistant Examiner* — Gregory Lane
(74) *Attorney, Agent, or Firm* — Dickstein Shapiro LLP

(57) ABSTRACT

When connecting a mobile information terminal to a communication network via a public access point, a user of the mobile information terminal is undesirably required to input detailed information for connection to the communication network via a poor input interface. In order to solve this problem, the information acquisition function receives network connection setting information from a setting information distribution server which distributes network connection setting information which is information indicative of settings of connections with communication networks. In accordance with the network connection setting information received by the information acquisition function, an NW connection function establishes a connection with a communication network via an access point.

52 Claims, 13 Drawing Sheets

(56) References Cited

U.S. PATENT DOCUMENTS

| | | | |
|---|---|---|---|
| 8,095,664 B2 | 1/2012 | Yamaguchi et al. | |
| 2003/0115339 A1 | 6/2003 | Hodoshima | |
| 2003/0212802 A1 | 11/2003 | Rector et al. | |
| 2004/0051664 A1* | 3/2004 | Frank | 342/457 |
| 2004/0110530 A1* | 6/2004 | Alone et al. | 455/552.1 |
| 2005/0012957 A1* | 1/2005 | Han | 358/1.15 |
| 2005/0070294 A1* | 3/2005 | Lyle et al. | 455/452.2 |

FOREIGN PATENT DOCUMENTS

| | | |
|---|---|---|
| JP | 03-009555 A | 1/1991 |
| JP | 11-3317 | 1/1999 |
| JP | 2001-325170 | 11/2001 |
| JP | 2002-135824 | 5/2002 |
| JP | 2002-232958 | 8/2002 |
| JP | 2002-236632 | 8/2002 |
| JP | 2002-291039 | 10/2002 |
| JP | 2002-318788 | 10/2002 |
| JP | 2002-351766 A | 12/2002 |
| JP | 2002-368761 | 12/2002 |
| JP | 2003-179545 | 6/2003 |
| JP | 2003-204335 A | 7/2003 |
| JP | 2003-235082 | 8/2003 |
| JP | 2003-332440 A | 11/2003 |
| JP | 2004-103703 A | 11/2003 |
| JP | 2004-007638 A | 1/2004 |
| JP | 2004-15211 | 1/2004 |
| JP | 2004-72546 | 3/2004 |
| JP | 2004-072546 A | 3/2004 |
| JP | 2004-78392 | 3/2004 |
| JP | 2004-88516 | 3/2004 |
| JP | 2004-088516 A | 3/2004 |
| JP | 2004-102464 A | 4/2004 |
| JP | 2004-120461 A | 4/2004 |
| JP | 2004-165755 | 6/2004 |

OTHER PUBLICATIONS

Japanese Office Action issued for corresponding application JP 2010-229027, date of mailing Mar. 4, 2013, English translation attached.

* cited by examiner

INFORMATION TERMINAL, SETTING INFORMATION DISTRIBUTION SERVER, RIGHT INFORMATION DISTRIBUTION SERVER, NETWORK CONNECTION SETTING PROGRAM AND METHOD

TECHNICAL FIELD

The present invention relates to an information terminal, a setting information distribution server, a right information distribution server, and network connection setting program and a method thereof, in which a function of accessing a communication network is provided.

BACKGROUND ART

A portable information terminal is simply equipped with a poor input interface such as a number bottom of a portable telephone and it is extremely inconvenient to perform connection setting for a wireless LAN (Local Area Network) or the like in comparison with the case of using, for example, a keyboard of a personal computer or the like. Also, the wireless LAN or the like would be more convenient if it is possible to visually determine whether there is the wireless LAN or the like which has a base station that is an access point to a network actually existing in the vicinity and whether or not the wireless LAN or the like is accessible in the case of existing.

Also, when information indicative of a setting of a connection with a communication network, such as the wireless LAN, is distributed to the portable information terminal as a right to establish a connection with a communication network, it is impossible to flexibly distribute information related to the right to establish a connection with a communication network and the setting information for establishing a connection with a communication network. As a specific example, it is impossible to selectively distribute only the information related to the right to establish a connection with a communication network to the portable information terminal, nor to selectively distribute only the information indicative of the setting of the connection with the communication network to the portable information terminal.

Related to the above technique, there is proposed a wireless communication access management server which transmits a registration form to a portable telephone terminal when a registration request for using the wireless LAN access point is transmitted from the portable telephone terminal (ex. Japanese Laid-Open Patent Application No. Jp-A 2003-235082, paragraphs 0015 to 0016, refer to FIG. 1). Upon receiving the registration form, a user inputs necessary items into the portable telephone terminal in accordance with the registration form, and the registration form is transmitted to the wireless communication access management server. Thereafter, the connection with the wireless LAN access point is allowed.

Also proposed is an information communication system in which a connection is established with an access point without any intention and decision of a user by obtaining information about the access point to be connected with positioning means, while there is information related to the position and the effective radio wave range of the access point in a server side (ex. Japanese Laid-Open Patent Application No. Jp-A 2002-236632, paragraphs 0061 to 0079; refer to FIG. 1).

Also proposed is a portable terminal device in which a connection is automatically established with priority with the access point in the shortest distance from the current position (ex. Japanese Laid-Open Patent Application No. Jp-A 2002-232958, paragraphs 0013 to 0022; refer to FIG. 1).

Also proposed is a method to display a screen of instruments connectable with a communication network using Bluetooth (registered trademark), so that a selection screen for setting a connection form and a data transfer is displayed when a user selects the instrument (ex. Japanese Laid-Open Patent Application No. Jp-A 2003-179545, paragraphs 0022 to 0027; refer to FIG. 1).

Also proposed is a network terminal in which setting information about the connection with the communication network is stored in an IC card so that a connection is established with a communication network on the basis of the setting information about the connection with the communication network stored in the IC card (ex. Japanese Laid-Open Patent Application No. Jp-A 2002-318788, paragraphs 0010 to 0011; refer to FIG. 1).

Also proposed is a wireless communication terminal in which an accessible instrument is recognized and displayed if an ID obtained from other Bluetooth terminals existing in the vicinity is registered in an instrument list containing an instrument ID of a Bluetooth terminal (ex. Japanese Laid-Open Patent Application No. Jp-A 2002-291039, paragraphs 0016 to 0024; refer to FIG. 1).

Also proposed is a network connection system in which, if there is a plurality of connection forms including a general public line, the connected lines are automatically recognized so as to automatically select and control communication elements and access points applicable to these lines (ex. Japanese Laid-Open Patent Application No. Jp-A 2002-135824, paragraphs 0012 to 0021; refer to FIG. 1).

Also proposed is an internet access device in which the most suitable provider, access point, access charge, access speed, and level of provided information or the like can be selected by looking at a plurality of providers, a plurality of access points, and other internet access information (access charge, access speed, and level of provided information or the like) to be displayed in access icons while internet information is displayed in a display unit (ex. Japanese Laid-Open Patent Application No. Jp-A Heisei 11-3317, paragraphs 0010 to 0027, refer to FIG. 1). In this internet access device, it is possible to change to another new provider and access point in the state that, for example, a homepage is kept open, so that internet access information can be arbitrarily selected and switched.

DISCLOSURE OF INVENTION

As a subject related to the present application, there is a problem of inconvenience when the wireless communication connection management server described in Japanese Laid-Open Patent Application No. Jp-A 2003-235082 is employed, because a user inputs a registration form via a poor input interface such as a number bottom of a portable telephone, In the information communication system described in Japanese Laid-Open Patent Application No. Jp-A 2002-236632, there is a problem of unconditional connection even when a user does not desire to establish a connection with the access point. There is another problem that a right can not be managed meticulously, so that the user needs to always make an inquiry to a server whether or not the user has the right to establish a connection with the access point.

In the portable terminal device described in Japanese Laid-Open Patent Application No. Jp-A 2002-232958, there is a problem of a possibility to establish a connection with a communication network which is different from a communication network certainly desired by a user.

In the method described in Japanese Unexamined Patent Publication No. Jp-A 2003-179545, there is two steps in order to establish a connection with an instrument, including an operation of a selection screen of connectable instruments and an operation of a setting screen thereafter. A user operation needs to be conducted twice (on the two screens) and there is a problem that setting is occasionally impossible without a certain extent of knowledge related to the connection of Bluetooth.

In the network terminal described in Japanese Laid-Open Patent Publication No. Jp-A 2002-318788, setting information about the connection with the communication network is obtained via an IC card, and there is a problem of a burdensome operation for a user to switch the IC card containing the setting information in order to acquire a plurality of the setting information or to switch the information in the IC card. Also, although there is a function to display a selection screen to select and determine a storage region for the case that a plurality of storage regions is stored in the IC card, but it is unknown whether or not it is actually connectable, which is problematic. Furthermore, there is another problem that the existence of access points of communication networks in the vicinity is not searched.

In the case of using the wireless communication terminal described in Japanese Laid-Open Patent Application No. Jp-A 2002-291039, a user instructs to edit an instrument list via an operation unit so that the instrument list is prepared. In this operation, inquiries are actually made to other Bluetooth terminals that are in the waiting state, so that a Bluetooth terminal in which the inquiries are received transmits its own ID and profile type to a Bluetooth terminal which makes the inquiries. Therefore, a Bluetooth terminal of a user collects the ID and profile type of a connectable Bluetooth terminal. That is, in order to make the Bluetooth terminal owned by the user to display connectability, there is a certainly required step in which a connection is actually established with a Bluetooth terminal in the vicinity to collect the ID thereof so as to prepare an instrument list by the user operation. Although this method seems to be no problem in the case of considering the usage in a private range such as the usage at home of the user, the user is required to prepare the list of instruments before using a public access point to be connected for the first time, which results in a problem of inconvenience.

In the network access system described in Japanese Laid-Open Patent Application No. Jp-A 2002-135824, connection conditions are detected, but there is no display related to a connection with a communication network using a wireless LAN existing in the vicinity. That is, there is a problem that a user does not know connectability with the communication network until a connection process is performed, because there is no display for connectability using the wireless LAN.

If a method using the internet access device described in Japanese Laid-Open Patent Application Publication No. Jp-A Heisei 11-3317 is applied to the access point composed of the wireless LAN, it is unknown whether or not there is a connectable access point existing in the vicinity of an information terminal of a user at present, so that the user temporarily uses a portable information terminal to perform a connection process, but it is unknown whether the connection is achieved successfully or unsuccessfully, until the connection process is performed, which is problematic.

According to the present invention, when it is determined that an information terminal owned by a user is connectable to multiple access points of communication networks existing in the vicinity, setting information of the communication networks received from a server and the communication networks (access points) connectable with the information terminal are scanned. In accordance with the scan result and necessity, a communication network list screen containing information related to a right to establish a connection with a network is generated and displayed on display means. Therefore, an object of the present invention is to provide an information terminal, a setting information distribution server, a right information distribution server, and a network connection setting program and a method thereof, in which a connection can be established with a communication network (access point) specified from the communication network list screen displayed on the information terminal, without user inputs of detailed information related to setting of the communication network.

As means of solving the above problems, an information terminal according to the present invention is an information terminal having a function of establishing a connection with a communication network, which includes; information acquisition means adapted to receive network connection setting information which is information indicative of settings of connections with communication networks from a setting information distribution server which distributes network connection setting information; network connection means adapted to scan communication networks having an access point in the vicinity; and network connection control means adapted to extract communication networks connectable to the information terminal on the basis of the network connection setting information received by the information acquisition means and the result of the scanning by the network connection means.

Alternatively, an information terminal according to the present invention is an information terminal having a function of establishing a connection with a communication network, which includes: network connection means adapted to scan communication networks having an access point in the vicinity and to transmit the scan result to a setting information distribution server which distributes network connection setting information which is information indicative of settings of connections with communication networks; information acquisition means adapted to receive, from the setting information distribution server, the network connection setting information associated with the scan result which is generated in the setting information distribution server; and network connection control means adapted to generate information for a screen display of communication networks connectable to the information terminal on the basis of the network connection setting information received by the information acquisition means.

Alternatively, an information terminal according to the present invention is an information terminal having a function of establishing a connection with a communication network, which includes: information acquisition means adapted to receive network right information containing information indicating a right of establishing a connection with a communication network from a right information distribution server which distributes network right information and to receive network connection setting information which is information indicative of settings of connections with communication networks from a setting information distribution server which distributes network connection setting information; network connection means adapted to scan communication networks having an access point in the vicinity; and network connection control means adapted to extract communication networks connectable to the information terminal on the basis of the network right information and the network connection setting information that are received by the information acquisition means, and the result of the scanning by the network connection means.

Alternatively, an information terminal according to the present invention is an information terminal having a function of establishing a connection with a communication network, which includes: network connection means adapted to scan communication networks having an access point in the vicinity and to transmit the scan result to a setting information distribution server which distributes network connection setting information which is information indicative of settings of connections with communication networks; information acquisition means adapted to receive network right information containing information indicating a right to establish a connection with a communication network from a right information distribution server which distributes network right information and to receive, from a setting information distribution server, the network connection setting information associated with the scan result generated in the setting information distribution server; and network connection control means adapted to generate information for a screen display of communication networks connectable with the information terminal on the basis of the network right information and the network connection setting information that are received by the information acquisition means.

Alternatively, an information terminal according to the present invention is an information terminal having a function of establishing a connection with a communication network, which includes: network connection means adapted to scan communication networks having an access point in the vicinity and to output the scan result; user information storage means adapted to store user information identifying a user and containing information indicating a communication network associated with the user; information acquisition means adapted to transmit the user information and the result of the scanning by the network connection means to a setting information distribution server which distributes network connection setting information which is information indicative of settings of connections with communication networks and to receive the network connection setting information associated with the user information generated by the setting information distribution server and the result of the scanning from the setting information distribution server; and network connection control means adapted to generate information for a screen display of communication networks connectable with the information terminal on the basis of the network connection setting information received by the information acquisition means.

Furthermore, the network connection control means in the information terminal according to the present invention, generates information about the screen display of the extracted connectable communication networks in descending order of frequency of connections with the information terminal or in descending order of recency of date and time of connections with the information terminal.

The information terminal according to the present invention also includes display control means adapted to display on the display means the communication networks connectable with the information terminal on the basis of the screen display information generated by the network connection control means, and to output information for specifying a communication network to be connected to the network connection control means in accordance with a user operation so as to instruct to establish a connection with the communication network.

The information terminal according to the present invention also includes storage means storing a plurality of connection operation policies, which are information indicating a connection operation form predetermined for the information terminal itself, and connection operation policy setting information, which is information specifying the connection operation policy according to which the network connection control means and the network connection means are operated, so that the network connection control means and the network connection means specify the connection operation policy setting information on the basis of one or more of the received network right information, the received network connection setting information and the result of the scanning by the network connection means, to operate on the basis of the connection operation policy in accordance with the specified connection operation policy setting information.

Additionally, a setting information distribution server according to the present invention is a setting information distribution server distributing network connection setting information, which is information indicative of setting of establishment of a connection with communication networks, which includes: storage means adapted to store the network connection setting information so as to relate the network connection setting information with user information, which is information specifying a user, and communication network information specifying the communication network; and transmission/reception means adapted to receive from the information terminal a request for the distribution of the network connection setting information with which the user information and the communication network information are attached, and to transmit the network connection setting information to the information terminal on the basis of the relation information of the user information and the communication network, the relation information being stored in the storage means.

Additionally, a network connection setting program according to the present invention allows a computer having a function of establishing a communication network to execute: an information acquisition process of receiving network connection setting information, which is information indicative of settings of connections with communication networks, from a setting information distribution server which distributes the network connection setting information; a network connection process of scanning communication networks having an access point in the vicinity; and a network connection control process of extracting communication networks connectable with a computer on the basis of the received network connection setting information and the result of the scanning in the network connection process.

Alternatively, a network connection setting program according to the present invention causes a computer having a function of establishing a connection with a communication network to executes: a network connection process of scanning the communication network having an access point in the vicinity and transmitting the scan result to a setting information distribution server which distributes network connection setting information, which is information indicative of settings of connections with communication networks; an information acquisition process of receiving the network connection setting information associated with the scan result generated by the setting information distribution server from the setting information distribution server; and a network connection control process of generating information for a screen display of communication networks connectable with the information terminal on the basis of the network connection setting information received in the information acquisition process.

Alternatively, a network connection setting program according to the present invention causes a computer having a function of establishing a connection with a communication network to execute: an information acquisition process of receiving network right information containing information indicating a right of establishing a connection with a communication network from a right information distribution server which distributes network right information and of receiving network connection setting information, which is setting information of establishing a connection with communication networks from a setting information distribution server which distributes the network connection setting information, a network connection process of scanning communication networks having an access point in the vicinity; and a network connection control process of extracting communication networks connectable with an information terminal on the basis of the network right information and the network connection setting information received in the information acquisition process and the result of the scanning by network connection means.

Alternatively, a network connection setting program according to the present invention also causes a computer having a function of establishing a connection with a communication network to execute: a network connection process of scanning communication networks having an access point in the vicinity and of transmitting the scan result to a setting information distribution server which distributes network distribution setting information, which is information indicative of settings of connections with communication networks; an information acquisition process of receiving network right information containing information indicating a right of establishing a connection with a communication network from the right information distribution server which distributes the network right information and of receiving, from the setting information distribution server, the network connection setting information associated with the scan result generated in the setting information distribution server; and a network connection control process of generating information for a screen display of communication networks connectable to the information terminal on the basis of the network right information and the network connection setting information received in the information acquisition process.

Alternatively, a network connection setting program according to the present invention causes a computer having a function of establishing a connection with a communication network to execute: a network connection process of scanning communication networks having an access point in the vicinity and of outputting the scan result; a user information storage process of storing user information specifying a user and containing information indicating a communication network associated with the user; an information acquisition process of transmitting the user information and the result of the scanning by network connection means to the setting information distribution server which distributes network setting information which is information indicative of settings of connections with communication networks, and of receiving, from the setting information distribution server, the network connection setting information associated with the user information and the scan result which is generated in the setting information distribution server; and a network connection control process of generating information for a screen display of communication networks connectable to the information terminal on the basis of the network connection setting information received in the information acquisition process.

In the network connection control process in the network connection setting program according to the present invention, the information about the screen display of the extracted connectable communication networks is generated in descending order of the frequency of connections with the computer or in descending order of the recency of date and time of connections with the computer.

The network connection setting program according to the present invention also includes a display control process of displaying the communication networks connectable with the computer on the basis of the screen display information generated in the network connection control process, and of instructing to establish a connection with a communication network by outputting information specifying the communication network with which a connection is to be established to the network connection control process in accordance with a user operation.

The network connection setting program according to the present invention also includes a storage process of storing a plurality of connection operation policies, which are information indicating a connection operation form predetermined for a computer, and connection operation policy setting information, which is information specifying the connection operation policy according to which the network connection control process and the network connection process are executed, so that, in the network connection control process and the network connection process, the connection operation policy setting information is specified on the basis of one or more of the received network right information, the received network connection setting information, and the result of the scanning in the network connection process, and the network connection control process and the network connection process are executed on the basis of the connection operation policy corresponding to the specified connection operation policy setting information.

Additionally, a setting information distribution program according to the present invention causes a computer having a function of distributing network connection setting information which is information indicative of settings of connections with communication networks to execute: a storage process of storing the network connection setting information in the storage means so as to relating the network connection setting information with user information, which is information specifying a user, and communication network information specifying a communication network; and a transmission/reception process of receiving a request for distributing the network connection setting information with which the user information and the communication network information are attached from an information terminal and of transmitting the network connection setting information to the information terminal on the basis of the relation information of the user information and the communication network stored in the storage means.

Also, a network connection setting method according to the present invention is a network connection setting method of allowing an information terminal to be connected with a communication network, the method including: receiving network connection setting information which is information indicative of settings of connections with communication networks from the setting information distribution server which distributes the network connection setting information; scanning communication networks having an access point in the vicinity; and extracting communication networks connectable with the information terminal on the basis of the received network connection setting information and the scan result.

Alternatively, a network connection setting method according to the present invention is also a network connection setting method of allowing an information terminal to be connected with a communication network, the method including: scanning communication networks having an access point in the vicinity; transmitting the scan result to a setting information distribution server which distributes network connection setting information, which is information indicative of settings of connections with communication networks; receiving the network connection setting information associated with the scan result and generated in the setting information distribution server from the setting information distribution server; and generating information for a screen display of communication networks connectable with an information terminal on the basis of the received network connection setting information.

Alternatively, a network connection setting method according to the present invention is a network connection setting method of allowing an information terminal to be connected with a communication network, the method including: receiving network right information containing information indicating a right of establishing a connection with a communication network from a right information distribution server which distributes the network right information; receiving network connection setting information, which is information indicative of settings of connections with communication networks from a setting information distribution server which distributes the network connection setting information; scanning communication networks having an access point in the vicinity; and extracting communication networks connectable with the information terminal on the basis of the received network right information, the received network connection setting information, and the scan result.

Alternatively, a network connection setting method according to the present invention is a network connection setting method of allowing an information terminal to be connected with a communication network, the method comprising: scanning communication networks having an access point in the vicinity, transmitting the scanned result to a setting information distribution server which distributes network connection setting information, which is information indicative of settings of connections with communication networks; receiving network right information containing information indicating a right of establishing a connection with a communication network from a right information distribution server which distributes the network right information; receiving the network connection setting information associated with the scan result generated in the setting information distribution server from the setting information distribution server; and generating information for a screen display of communication networks connectable with the information terminal on the basis of the received network right information and the received network connection setting information.

Alternatively, a network connection setting method according to the present invention is a network connection setting method of allowing an information terminal to be connected with a communication network, the method including: scanning communication networks having an access point in the vicinity; storing user information specifying a user and containing information specifying a communication network associated with the user; transmitting the stored user information and the scan result to a setting information distribution server which distributes network connection setting information, which is setting information of establishing a connection with communication networks; receiving the network connection setting information associated with the user information and the scan result generated in the setting information distribution server from the setting information distribution server; and generating information for a screen display of communication networks connected with the information terminal on the basis of the received network connection setting information.

In the network connection setting method according to the present invention, the information about the communication networks connectable with the information terminal is displayed on the basis of the generated screen display information, and the information specifying the communication network to access is outputted in accordance with a user instruction so as to instruct to establish a connection with the communication network.

In the network connection setting method according to the present invention, a plurality of connection operation policies, which are information indicating a predetermined connection operation form, and information specifying the connection operation policy according to which the network connection control process and the network connection process are executed are stored, and the connection operation policy setting information is specified on the basis of one or more of the received network right information, the received network connection setting information and the result of the scanning in the network connection process, so that the network connection control process and the network connection process are performed on the basis of the connection operation policy associated with the specified connection operation policy setting information.

Additionally, a setting information distribution method according to the present invention is a setting information distribution method for distributing network connection setting information, which is information indicative of settings of connections with communication networks, the method including: storing the network connection setting information so as to be associated with user information specifying a user and communication network information specifying a communication network; receiving a request for distributing the network connection setting information attached with the user information and the communication network information from an information terminal; and transmitting the network connection setting information to the information terminal on the basis of relation information of the stored user information and communication network.

Additionally, a network system according to the present invention is a network system in which an information terminal is connected with a communication network via an access point, the system including: a setting information distribution server adapted to distribute network connection setting information which is information indicative of settings of connections with communication networks; and an information terminal adapted to receive the network connection setting information from the setting information distribution server, to scan communication networks having an access point in the vicinity, and to extract accessible communication networks on the basis of the received network connection setting information and the scan result.

Alternatively, a network system according to the present invention is a network system in which an information terminal is connected with a communication network via an access point, the system including: a setting information distribution server adapted to store network connection setting information, which is information indicative of settings of connections with communication networks, while relating the network connection setting information with communication network information; and an information terminal adapted to scan communication networks having an access point in the vicinity, to transmit the communication network information based on the scan result to the setting information distribution server, to receive the network connection setting information associated with the communication network information based on the scan result generated in the setting information distribution server from the setting information distribution server; and to generate information for a screen display of the connectable communication networks on the basis of the received network connection setting information.

The network system according to the present invention further includes a right information distribution server which distributes network right information containing information indicating a right of establishing a connection with a communication network, wherein the information terminal is adapted to receive the network right information from the right information distribution server, to receive the network connection setting information from the setting information distribution server, and to scan communication networks having an access point in the vicinity, and to extract the connectable communication networks on the basis of the received network right information, the received network connection setting information and the scan result.

Alternatively, the network system according to the present invention further includes a right information distribution server which distributes network right information containing information indicating a right of establishing a connection with a communication network, in which the information terminal is adapted to receive the network right information from the right information distribution server, to scan communication networks having an access point in the vicinity, to transmit communication network information based on the scan result to the setting information distribution server, to receive the network connection setting information associated with the communication network information based on the scan result generated in the setting information distribution server from the setting information distribution server, and to extract the connectable communication networks on the basis of the received network right information and the received network connection setting information.

In the network system according to the present invention, the setting information distribution server is adapted to store network connection setting information, which is information indicative of settings of connections with communication networks, relating user information specifying a user with communication network information specifying communication networks, while the information terminal is adapted to scan communication networks having an access point in the vicinity, to transmit the stored user information and the scan result to the setting information distribution server, to receive the network connection setting information associated with the user information and the scan result generated in the setting information distribution server from the setting information distribution server, and to generate information for a screen display of the connectable communication networks on the basis of the received network connection setting information.

In the network system according to the present invention, the information terminal is adapted to store a plurality of connection operation policies, which are information indicating a predetermined connection operation form, and to operate in accordance with the connection operation policy specified on the basis of one or more of the received network right information, the received network connection setting information, and the result of the scanning by network connection means.

As described above, the present invention allows an information terminal to be connected with a communication network without user inputs of detailed information related to the connection of the communication network into the information terminal.

BEST MODE FOR CARRYING OUT THE INVENTION

First Embodiment

Figure 1:
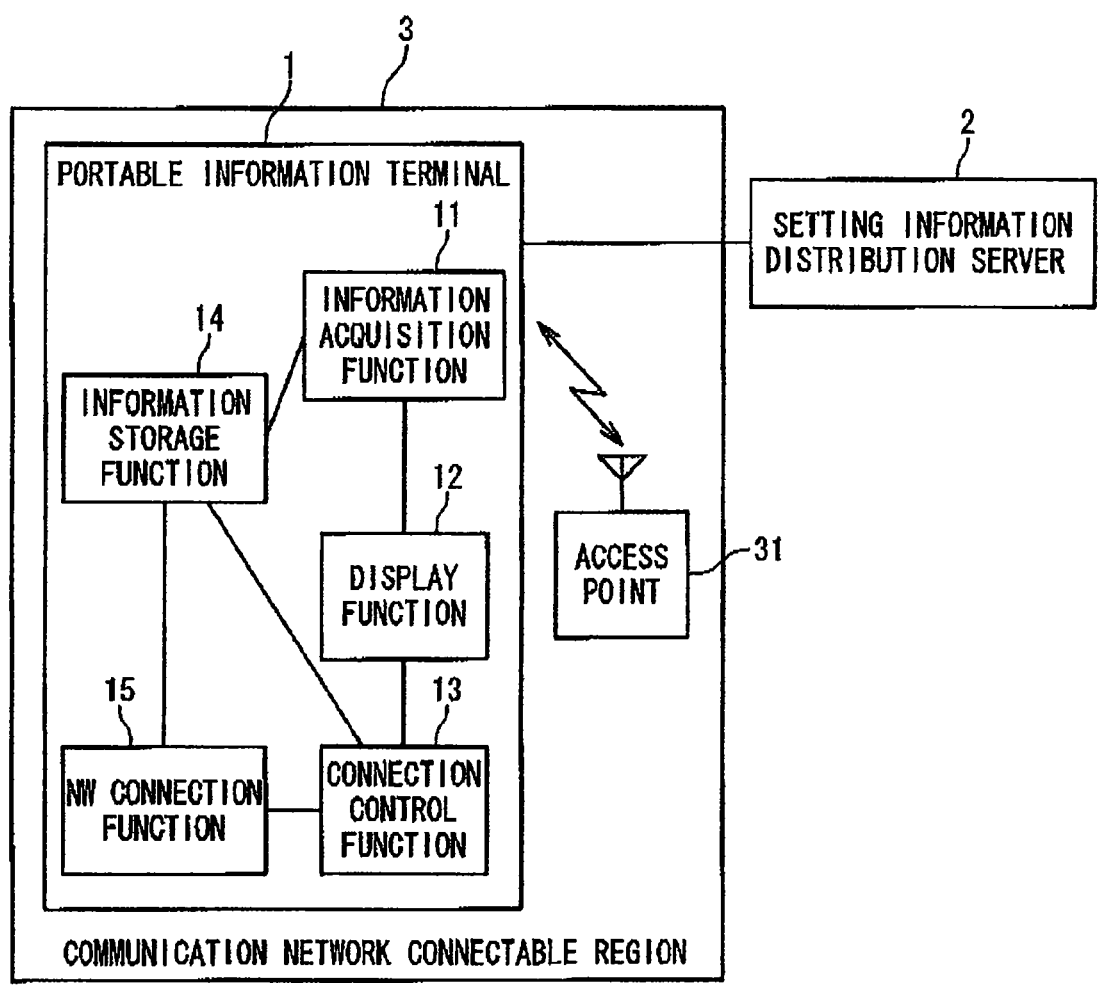
FIG. 1 is a block diagram showing an example of the configuration in a first embodiment of the present invention.

A first embodiment of the present invention will be explained referring to drawings. FIG. 1 is a block diagram showing an example of the configuration according to a first embodiment of the present invention.

Referring to FIG. 1, the first embodiment of the present invention includes a portable information terminal 1 which exchanges information with an instrument connected with a communication network (not shown), a setting information distribution server 2 which transmits network connection setting information which is information related to settings of connections with communication networks, and a communication network connectable region 3 which is a region in which the portable information terminal 1 can establish a connection with a communication network through a wireless LAN. A Hotpoint (registered trademark) may be used as the communication network connectable region 3, for example.

The portable information terminal 1 includes an information acquisition function (the information acquisition means) 11 adapted to receive the network connection setting information from the setting information distribution server 2, a display function (the display control means) 12 adapted to display information on display means, an NW (Network) connection control function (the network connection control means) 13 adapted to control connections with communication networks, an information storage function (network connection setting information storage means, network right information storage means, storage means, user information storage means, association relationship storage means, table storage means) 14 adapted to store received information, and an NW connection function (the network connection means) 15 adapted to establish a connection with a communication network.

The portable information terminal 1, which is an example of an information terminal in the present invention, is realized by, for example, a portable telephone and a PDA (Personal Digital Assistance) or the like having a function to establish a connection with a wireless LAN; however the present invention is not limited to those and may be, for example, a car navigation device and an information communication device mounted on a vehicle.

The information acquisition function 11 receives the network connection setting information from the setting information distribution server 2. For example, a public portable telephone communication network, a wireless LAN, an infrared ray communication or the like is used for communication between the portable information terminal 1 and the setting information distribution server 2. Additionally, the information acquisition function 11 forwards the received information to the information storage function 14 to store therein. The information storage function 14 is realized by, for example, an RAM (Random Access Memory) or the like.

The display function 12 has a function to receive display information received from the information acquisition function 11 or the NW connection control function 13, and to display the information on display means, such as a display device. Additionally, the display function 12 has a function to notify the information acquisition function 11 or the NW connection control function 13 of information selected by a user operating an operation unit (not shown) on the basis of the display information displayed on the display means.

The NW connection control function 13 has a function to prepare connectable communication network list display information by using the information related to a connection with communication networks obtained from the NW connection function 15 and the information storage function 14, and to request the display information 12 to display the information; the connectable communication network list display information is information containing a list of communication networks to which the portable information terminal 1 is connectable. The NW connection control function 13 also has a function to notify the NW connection function 15 of a communication network connection request received from the display function 12, when a user operates the operation unit to select a connection with a communication network.

The information storage function 14 has a function to store the network connection setting information and information received via communication networks. The NW connection function 15 has a function of searching (or scanning) the communication network connectable region 3 positioned in the vicinity of the portable information terminal 1 to notify the NW connection control function 13, and a function to establish a connection with a communication network in the vicinity thereof. The vicinity of the portable information terminal 1 here means a distance in which the NW connection function 15 of the portable information terminal 1 is connectable to an access point of a communication network, and it is, for example, the distance of about 100 m when the portable information terminal 1 is connected with an access point 31 via a wireless LAN.

The search (or the scanning) implemented by the NW connection function 15 may be a passive scan or an active scan in a wireless LAN. The passive scan is a method of monitoring a beacon signal outputted from an access point of a wireless LAN for a fixed period of time. On the other hand, the active scan is a method in which the portable information terminal 1 outputs a probe frame so that an access point of a wireless LAN transmits a response to the portable information terminal 1 upon receiving the probe frame, while the portable information terminal 1 receives the response.

The setting information distribution server 2 is a server including generation means adapted to generate network connection information indicative of settings of connections with an access point of a communication network, storage means adapted to store the network connection setting information, and the transmission/reception means adapted to distribute the network connection setting information to the portable information terminal 1.

The communication network connectable region 3 is a region in which the portable information terminal 1 is connectable to a communication network. At least one access point 31 is arranged in the communication network connectable region 3.

The portable information terminal 1 contains a network connection setting program in a storage unit thereof. When the network connection setting program is executed, a set of processes are executed, including a information acquisition process to receive network connection setting information, which is setting information used to establish a connection with communication networks, from the setting information distribution server 2 which distributes the network connection setting information; and a network connection process to establish a connection with a communication network on the basis of the received network connection setting information. In the network connection process, a communication network(s) having an access point in the vicinity is scanned, and a network connection control process is implemented to extract communication networks connectable to a computer (portable information terminal 1) on the basis of the received network connection setting information and the result of the scanning in the network connection process. Additionally, screen information about a list of communication networks which indicates the existence of the network connection setting information and the existence of access points of communication network in the vicinity of the portable information terminal 1 is generated for each of the extracted communication networks in the network connection control process. Furthermore, screen information from which a communication network(s) which does not receive the network connection setting information is excluded is generated in the network connection process. When network connection setting information containing information of names of communication networks is received by in an information acquisition process, the names of the communication networks are extracted from the network connection setting information in the network connection process. When the names of the network communications are extracted, screen information about a list of the names of the communication networks is generated in the network connection process. When the screen information is generated in the network connection control process, a display control process is implemented to display the screen information on the display means of the portable information terminal 1. In the display control process, information to specify a communication network to be connected is generated in accordance with a user operation. In the network connection process, a connection is established with the communication network on the basis of the information to specify the communication network to be connected. In the display control process, information to specify another communication network to be connected is generated in accordance with the user operation, while the connection with one communication network is kept established, and in the network connection process, the connection with the one communication network is cut off, and a connection with the other communication network is established on the basis of the information to specify the other communication network to be connected. Moreover, in the display control process, information indicating cut-off of a connection with a communication network is generated in accordance with a user operation, while the connection is kept established with the communication network. In the network connection process, the connection with the communication network is cut off on the basis of the information indicating the cut off of the connection with the communication network in the, and a network connection setting information storage process is implemented to store the network connection setting information which is received in the information acquisition process from the setting information distribution server 2 in the network connection setting information storage means which stores the network connection setting information.

The setting information distribution server 2 contains a setting information distribution program to execute a storage process in which network connection setting information, which is information indicative of settings of connections with communication networks, is stored in the storage means, and to execute a transmission/reception process in which the network connection setting information is distributed to the portable information terminal 1.

Figure 2:
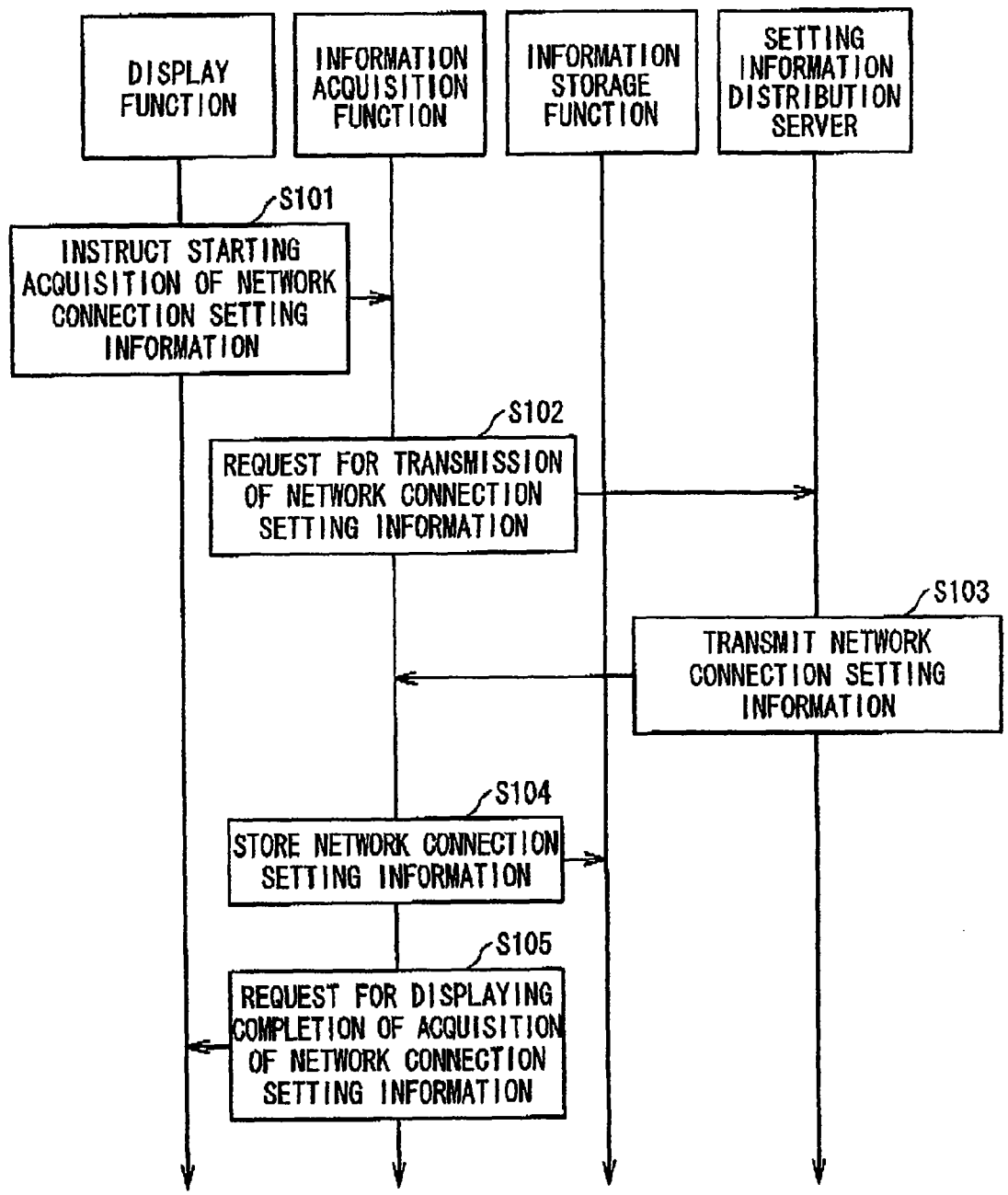
FIG. 2 is a sequence diagram explaining acquisition of network connection setting information in the first embodiment of the present invention.

An operation in the first embodiment of the present invention will be explained next. The operation in the first embodiment of the present invention can be divided into network connection setting information acquisition, network connection establishment, network connection cutoff, and network switching. The network connection setting information acquisition will be explained first. FIG. 2 is a sequence diagram explaining the network connection setting information acquisition in the first embodiment of the present invention.

A user of the portable information terminal 1 operates the operation unit of the portable information terminal 1 to allow the display function 12 to display a network connection setting information acquisition screen on the display means; the network connection setting information acquisition screen is a screen used to select instructions to acquire the network connection setting information. When acquiring the network connection setting information by a communication with directivity, such as an infrared ray communication, the user directs the portable information terminal 1 toward the setting information distribution server 2. Then, the user operates the operation unit of the portable information terminal 1 to move a cursor into a region indicating a communication start displayed on the display means or the like, and thereby select the instruction to acquire the network connection setting information. This allows the display function 12 to forward a network connection setting information acquisition start command, which is a command indicating to receive the network connection setting information from the setting information distribution server 2, to the information acquisition function 11 (Step S101).

When the portable information terminal 1 is already connected with, for example, an access point 31 of the communication network connectable region 3 through a wireless LAN or the like and the information storage function 14 stores the network connection setting information which can be acquired in the communication network connectable region 3, the display function 12 displays the network connection setting information which can be acquired in the communication network connectable region 3 on the display means. It should be noted that when the information storage function 14 stores a plurality of pieces of the network connection setting information, the display function 12 displays a list thereof on the display means. The user operates the operation unit to select network connection setting information to be acquired. Then, the display function 12 forwards a network connection setting information acquisition start command of the network connection setting information selected by the user to the information acquisition function 11.

The network connection setting information acquisition start command contains the type of a communication path (for example, a portable telephone network, the wireless LAN, and infrared rays or the like) used to acquire the network connection setting information, and an address of the setting information distribution server 2 to be communicated, if necessary.

The information acquisition function 11 accesses the setting information distribution server 2 on the basis of the network connection setting information acquisition start command received from the display function 12 so as to request for transmitting the network connection setting information (Step S102). The setting information distribution server 2 transmits the network connection setting information to the portable information terminal 1 in accordance with the request for transmitting the network connection setting information (Step S103). In the portable information terminal 1, the information acquisition function 11 receives (acquires) the network connection setting information. The network connection setting information contains names of communication networks (communication network names), network information (ESS-IDs (Extended Service Set Identifiers) or the like in the case of the wireless LAN), and network authentication information (WEP (Wired Equivalent Privacy) keys and passwords or the like in the case of the wireless LAN). The names of the communication networks are stored in the setting information distribution server 2 after being determined by the administrator of the communication networks in advance, for example.

When acquiring the network connection setting information, the information acquisition function 11 forwards the network connection setting information to the information storage function 14 to store therein (Step S104).

After forwarding the network connection setting information to the information storage function 14, the information acquisition function 11 request the display function 12 to display a screen indicating that the process to acquire the network connection setting information is completed on the display means (Step S105). The display function 12 displays the screen indicating that the processing to acquire the network connection setting information is completed on the display means.

It should be noted that the setting information distribution server 2 may generate the network connection setting information in advance before the Step S101, or generate the network connection setting information in response to the request for transmitting the network connection setting information at the Step S102.

Figure 3:
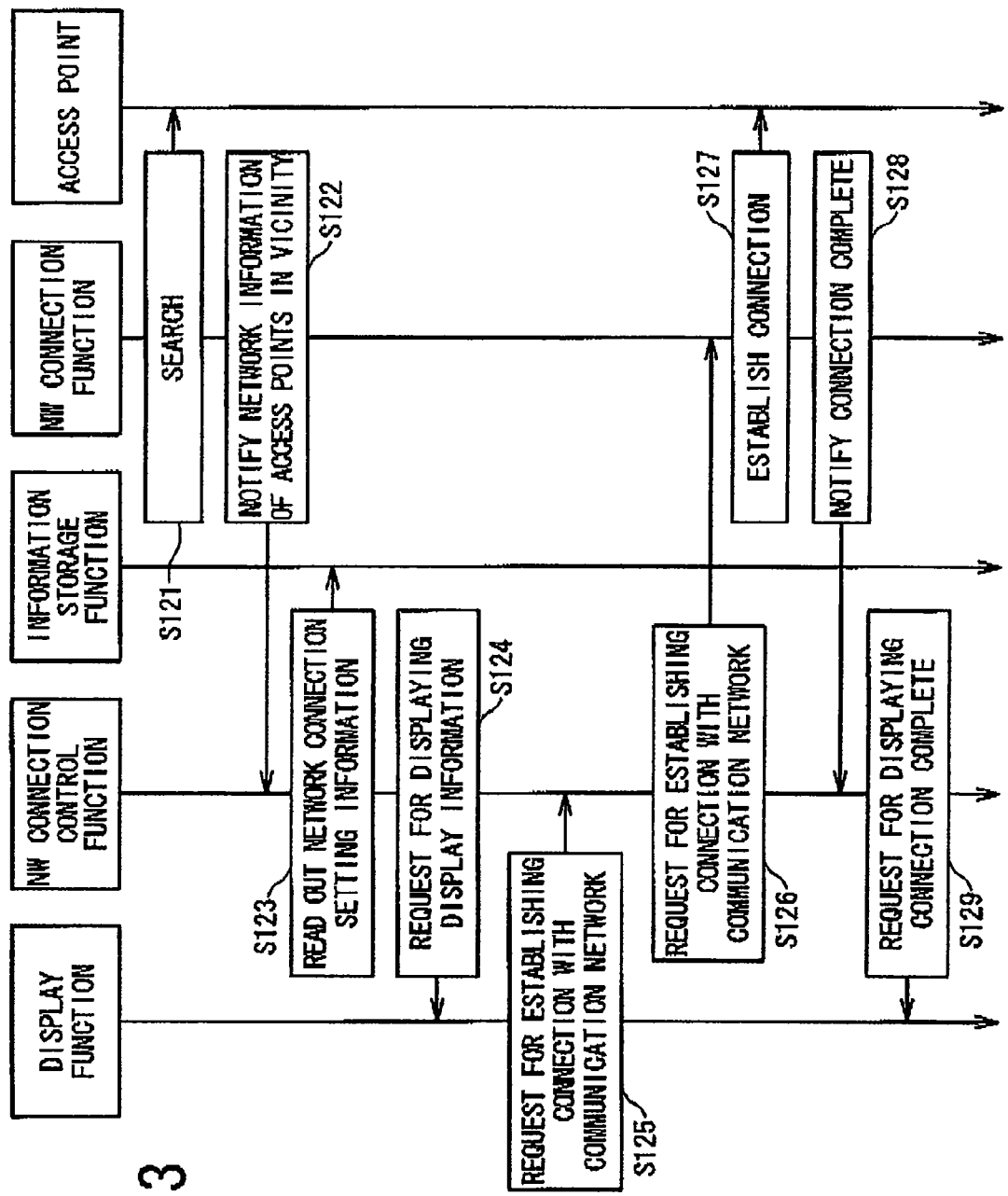
FIG. 3 is a sequence diagram explaining network connection in the first embodiment of the present invention.

A description is next given of the network connection establishment. FIG. 3 is a sequence diagram to explain the network access according to the first embodiment of the present invention.

The NW connection function 15 of the portable information terminal 1 searches (scans) access points 31 existing in the vicinity to acquire network information thereof (ESS IDs or the like in the case of the access points of the wireless LAN) (step S121).

The NW connection function 15 notifies the NW connection control function 13 of the acquired network information (step S122). When a plurality of access points exist in the vicinity of the portable information terminal 1, a plurality of pieces of the network information are notified.

The NW connection control function 13 reads out the network connection setting information stored in the information storage function 14 (step S123).

The NW connection control function 13 determines that only the communication network(s) for which both two pieces of information are prepared: the network information notified by the NW connection function 15 and the network connection setting information read by the information storage function 14 is a connectable communication network(s), and extracts such communication network(s). The network connection setting information contains the network information, and therefore it is easy to extract the network connection setting information of the communication network(s) existing in the vicinity. Specifically, the NW connection control function 13 determines that the communication network is connectable when the network information notified by the NW connection function 15 is consistent with the network information contained in the network connection setting information read by the information storage function 14, for example, and extracts the communication network and the network connection setting information. In this extraction operation, a classification process is made as follows:

NW information A: communication network(s) having network connection setting information and an access point existing in the vicinity NW information B: communication network(s) having network connection setting information and no access point existing in the vicinity NW information C: communication network(s) having no network connection setting information but having an access point existing in the vicinity The NW connection control function 13 further generates connectable communication network list display information which is display information to display the NW information A. At this time, the NW connection control function 13 extracts the communication network name(s) from the network connection setting information. The connectable communication network list display information includes the communication network name(s) contained in the network connection setting information read by the information storage function 14, not including the network information received by the NW connection function 15, for assumable easy recognition of the communication network(s) by the user. It should be noted that the connectable communication network list display information contains a list of the communication network names, when there is a plurality of communication networks classified as the NW information A. The NW connection control function 13 may generate display information to display the NW information A and the NW information B. If the display information includes the NW information A and the NW information B, the display information belonging to the NW information A contains information indicating that the access point of the communication network is confirmed to be in the vicinity, while the display information belonging to the NW information B does not contain the information indicating that the access point of the communication network is confirmed to be in the vicinity.

The NW connection control function 13 may also generate display information to display the NW information A, the NW information B and the NW information C. When the display information includes the NW information A, the NW information B and the NW information C, the display information related to the NW information A and the NW information B contains the existence of the information indicating that the access point of the communication network is confirmed to be in the vicinity. The display information related to the NW information C contains information that there is an access point of a communication network which is not connectable to the portable information terminal 1 existing in the vicinity.

When the network information is not notified from the NW connection function 15, that is, when no access points of communication networks exist in the vicinity, the NW connection control function 13 generates display information only related to the NW information B, display information only related to the NW information B and the NW information C, or display information related to the NW information C.

In order to determine information among the NW information A, the NW information B and the NW information C for the NW connection control function 13 to contain for generating the display information, a display information generation policy is set or mounted to the NW connection control function 13 in advance by a user of the portable information terminal 1, so that the NW connection control function 13 generate the display information in accordance with the display information generation policy.

The NW connection control function 13 outputs the generated display information to the display function 12, and requests the display function 12 to display it on the display means (Step S124).

The display function 12 displays display the communication network list screen which is a screen based on the display information outputted from the NW connection control function 13 on the display means. The display information contains information about the connectable communication network(s). The display function 12 may display a list of a plurality of communication networks or unconnectable networks on the display means. When the list of the plurality of communication networks is displayed on the display means, the user selects a communication network to be connected from the list. The display function 12 notifies the NW connection control function 13 of the communication network selected by the user, and requests for establishing a connection (Step S125). When the list of the plurality of the communication networks is displayed on the display means, for example, following methods is used in the display function 12 to display the communication networks classified as the NW information A, the NW information B and the NW information C.

Display A: displaying the name(s) of the communication network(s) accompanied by an icon(s) indicating that the communication network(s) is connectable.

Display B: displaying only the name(s) of the communication network(s).

Display C: displaying that details of the communication network are unknown.

Figure 4:
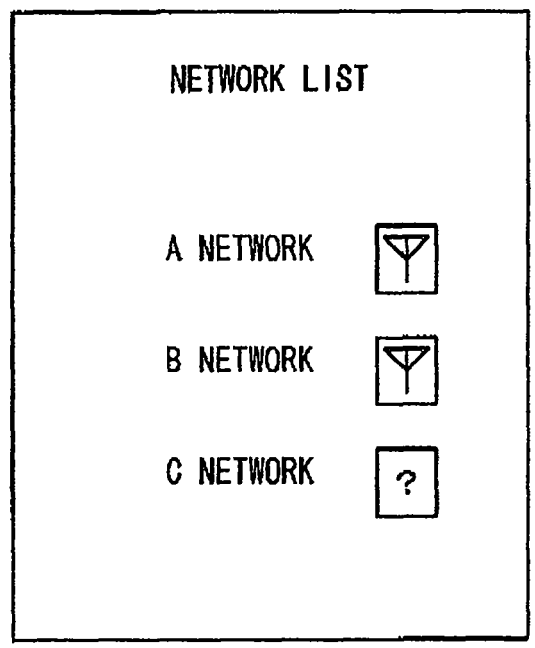
FIG. 4 is an explanatory diagram showing an example of a display when an NW access control function notifies display means of display information containing NW information A and NW information B.

FIG. 4 is an explanatory diagram showing an example of a display in the case when the NW connection control function 13 notifies the display function 12 of the display information containing the NW information A and the NW information B. In the example shown in FIG. 4 the network connection setting information are related to an A network, a B network and a C network, indicating that access points of the A network and the B network exist in the vicinity and are connectable.

When the NW connection control function 13 receives a request for establishing a connection with the communication network selected by the user, the request is outputted to the NW connection function 15 (step S126).

If the connection request outputted to the NW connection function 15 by the NW connection control function 13 indicates a communication network name, the NW connection function 15 reads out the network connection setting information identified by the communication network name from the information storage function 14. The NW connection function 15 establishes a connection with the access point 31 on the basis of the network connection setting information read out. When the connection request outputted to the NW connection function 15 by the NW connection control function 13 includes the network connection setting information, the NW connection function 15 establishes a connection with the access point 31 on the basis of the network connection setting information (Step S127).

After establishing the connection with the access point 31, the NW connection function 15 outputs an connection completion notice to the NW connection control function 13 (Step S128).

Figure 5:
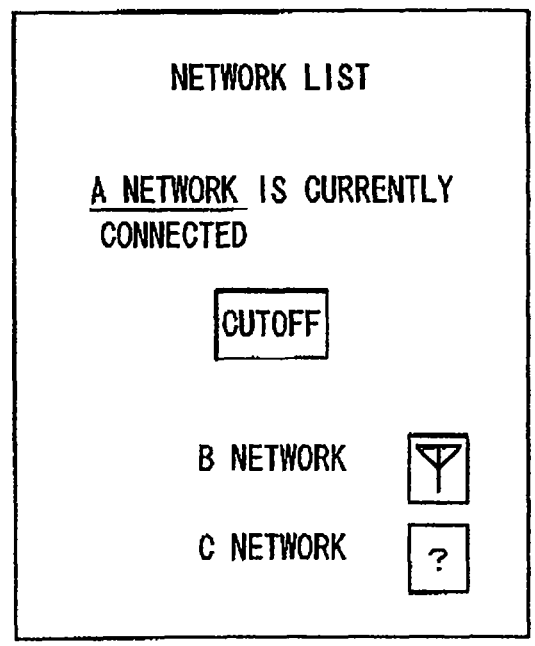
FIG. 5 is an explanatory diagram showing a display example when a portable information terminal is connected with a network A.

Upon receiving the connection completion notice, the NW connection control function 13 generates connection completion display information which is information indicating that the access point 31 was accessed, and outputs the generated connection completion display information to the display function 12 so as to request for displaying the information indicating that the connection with the access point 31 is established (Step S129). The connection completion display information may also contain information about the communication network which is currently connected, or information about a communication network which is not connected. The display function 12 displays on the display means that the connection with the access point 31 is established on the basis of the connection completion display information outputted by the NW connection control function 13. FIG. 5 is an explanatory diagram showing a display example when the portable information terminal 1 is connected with the A network.

Figure 6:
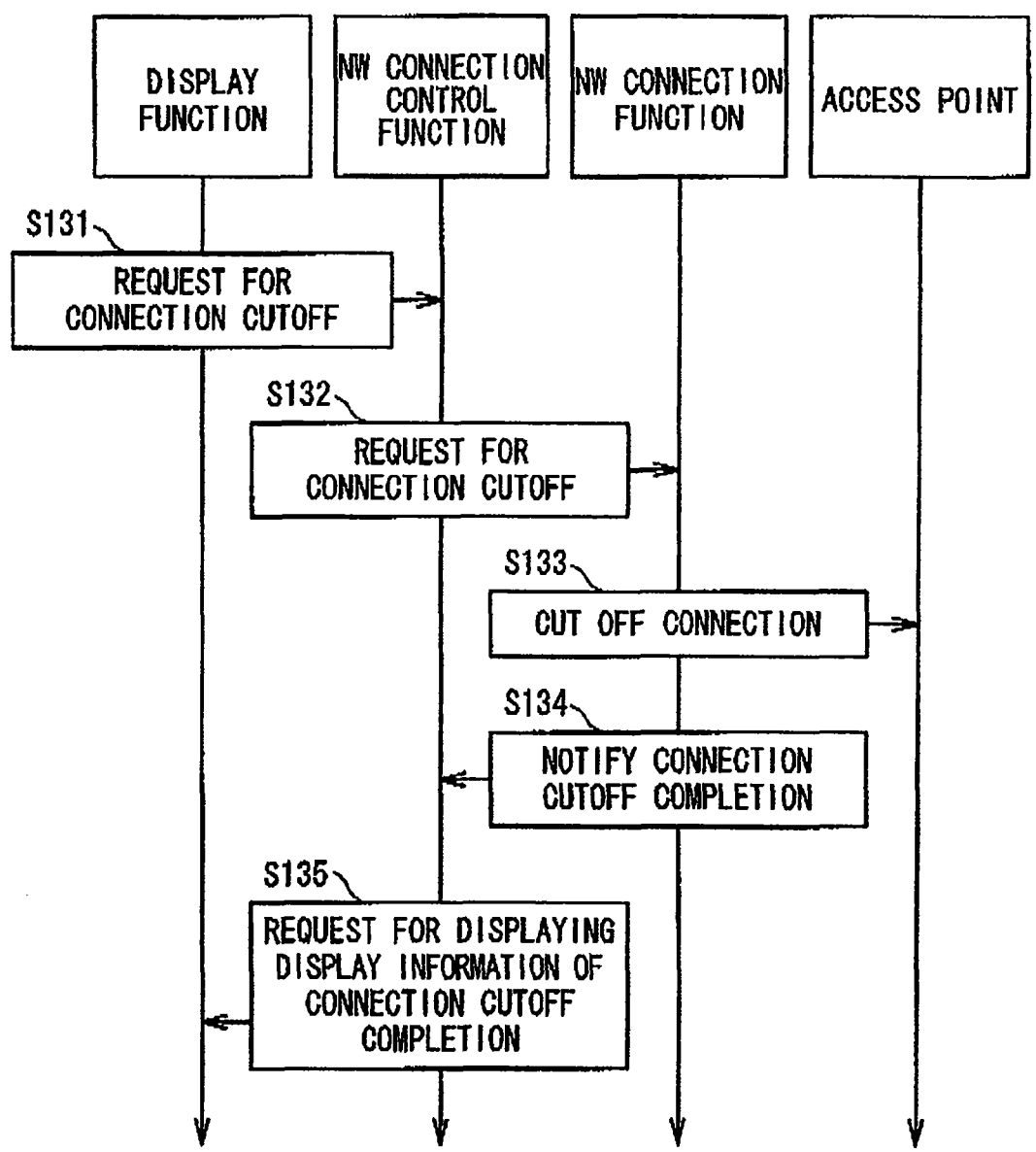
FIG. 6 is a sequence diagram explaining an operation of the cutoff of the connection with a communication network in the first embodiment of the present invention.

Explained next will be an operation in the case of cutting off the connection with the communication network. FIG. 6 is a sequence diagram explaining the operation in cutting off the connection with the communication network in the first embodiment of the present invention.

It is assumed that the display function 12 displays the example screen shown in FIG. 5 on the display means. When desiring to cut off the connection with the network, the user selects the "cutoff" on the display shown in the example screen of FIG. 5. This allows the display function 12 to output a cutoff request to the NW connection control function 13 (Step S131).

The NW connection control function 13 forwards the cutoff request to the NW connection function 15 (Step S132). Upon receiving the cutoff request, the NW connection function 15 executes a cutoff process (step S133). At this time, the NW connection function 15 may notify the access point 31 of the cutoff of the connection.

When the cutoff process is completed, the NW connection function 15 outputs a connection cutoff completion notice to the NW connection control function 13 (Step S134).

Upon receiving the connection cutoff completion notice, the NW connection control function 13 generates display information after the cutoff, and forwards the generated display information to the display function 12 to request for displaying the display information (Step S135). The display function 12 displays on the display means a screen indicating that the connection with the communication network is cut off on the basis of the display information received from the NW connection control function 13. The screen displayed on the display means here may include, for example, a network list display before the connection with the communication network as shown in the example of FIG. 4.

Figure 7:
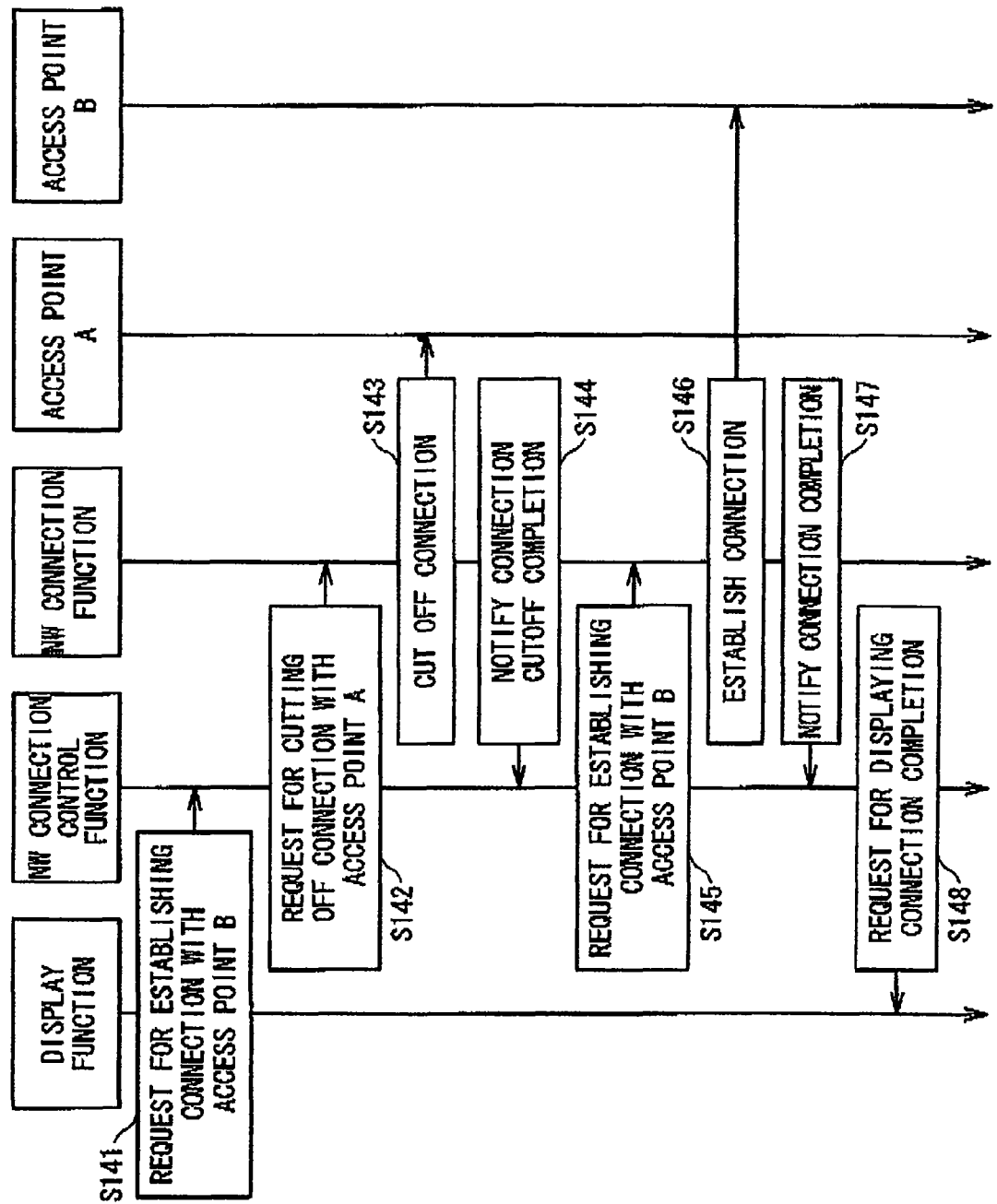
FIG. 7 is a sequence diagram explaining the case of switching communication networks to be connected in the first embodiment of the present invention.

A description is given of the case of switching connected communication networks. FIG. 7 is a sequence diagram explaining the case of switching connected communication networks in the first embodiment of the present invention.

The description given here uses an example of a process in the case of switching the connection to the B network when the portable information terminal 1 is connected with the A network.

The user operates the operation unit of the portable information terminal 1 to display a screen such as the example shown in FIG. 5 on the display means via the display function 12. When the user operates the operation unit to select the B network on this screen, for example, the display function 12 outputs a connection request (switching request) to the NW connection control function 13 to notify the selection (Step S141). At this time, the output process is same as that of the Step S125, and therefore the explanation thereof is omitted.

Upon receiving the connection request, the NW connection control function 13 determines whether or not there is a currently-connected communication network. If it is determined that there is a currently-connected communication network, the NW connection control function 13 forwards a cutoff request to the NW connection function 15 in the same manner as the Step S132 (Step S142).

Upon receiving the cutoff request, the NW connection function 15 executes the cutoff process (Step S143). At this time, the NW connection function 15 may notify the access point A of the cutoff of the connection.

When the cutoff process is completed, the NW connection function 15 outputs a cutoff completion notice to the NW connection control function 13 (Step S144).

When the connection with the currently-connected communication network is cut off, the NW connection control function 13 outputs, to the NW connection function 15, a connection request for establishing a connection with the communication network indicated by the connection request outputted by the display function 12 to the NW connection control function 13 at the Step S141 (Step S145). In the following it is assumed that the communication network indicated by the connection request outputted by the display function 12 to the NW connection control function 13 at the Step S141 is a communication network having an access point B.

If the connection request outputted by the NW connection control function 13 to the NW connection function 15 indicates the communication network name, the NW connection function 15 reads out the network connection setting information identified by the communication network name from the information storage function 14. The NW connection function 15 establishes a connection with the access point B on the basis of the read network connection setting information. When the connection request outputted by the NW connection control function 13 to the NW connection function 15 includes the network connection setting information, the NW connection function 15 establishes a connection with the access point B on the basis of the network connection setting information (Step S146).

After establishing the connection with the access point B, the NW connection function 15 outputs a connection completion notice to the NW connection control function 13 (Step S147).

Figure 8:
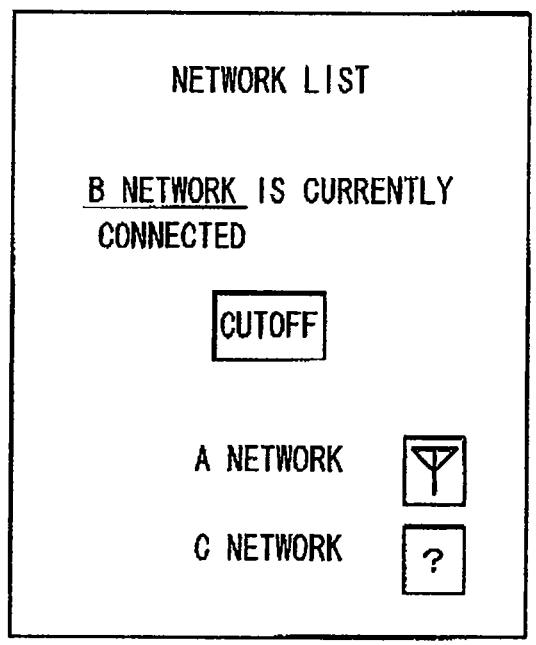
FIG. 8 is an explanatory diagram showing a display example when the portable information terminal is connected with a network B.

Upon receiving the connection completion notice, the NW connection control function 13 generates connection completion display information which is information indicating that the connection with the access point B is established, and outputs the generated connection completion display information to the display function 12 to request for displaying the information indicating that the connection with the access point B is established (Step S148). The connection completion display information may also contain information about the communication network which is currently-connected or information about a communication network which is not connected. The display function 12 displays on the display means that the connection with the access point B is established on the basis of the connection completion display information outputted by the NW connection control function 13, FIG. 8 is an explanatory diagram showing a display example when the portable information terminal 1 is connected with the B network.

As described above, this embodiment allows a user to establish a connection with a communication network without inputting the network communication setting information to the portable information terminal 1 with a poor input interface, since the setting information distribution server 2 generates the network connection setting information of the communication network and the NW connection function 15 uses the network connection setting information for the network connection setting.

Additionally, no registration process is required for establishing a connection with a communication network, and a network is placed into an available state when the setting information distribution server 2 transmits the network connection setting information to the portable information terminal 1.

One example in which the registration process is not required is that a user goes to a shop and tells a salesperson a request for have a connection with a communication network, in which the portable information terminal 1 is directed to a POS (Point Of Sales) resistor or the like which functions as the setting information distribution server 2 after adjusting a usage charge, so that the user acquires the network connection setting information through an infrared communication, in other words, the user is allowed to establish the connection with the communication network. That is, the user is not required to input detailed network connection setting information, and simply selects the communication network desired to have a connection among from communication networks displayed on the communication network list screen (selects the communication network name with one click) to achieve the connection with the communication network.

Furthermore, the communication network to be actually connectable in the vicinity of the portable information terminal 1 is displayed on the communication network list screen, which is used as a criterion for a user to establish a connection with a communication network. This criterion reflects the result in actual search of connectability of access points of communication networks in the vicinity, and therefore the criterion is more accurate than that in the case without search.

The communication network list screen may display that the network connection setting information is stored in the portable information terminal 1 for a network having no access point that exists in the vicinity, other than the actually connectable communication network(s) having an access point that exists in the vicinity, which allows easily grasping network connection setting information owned by a user, and communication networks connectable at present using the information about the screen.

Additionally, since the communication network list screen further displays the name of the communication network with which the connection is established at present and information about the communication networks with the access points existing in the vicinity, it is easy to determine whether or not switching should be made if a user wishes to switch the communication network to access (ESS-ID or the like is not displayed on the screen as it is).

Furthermore, the communication network list screen is also generated dynamically depending on the result of the search of communication networks or the existence of the network connection setting information, so that accurate information can be provided for a user each time.

Moreover, since the communication network list screen displays the communication network names contained in the network connection setting information generated by the setting information distribution server 2 instead of network information such as ESS-IDs, information indicating the communication network can be displayed in Japanese or the like, so that it is easy for a user to understand the type of access points of communication networks existing in the vicinity and the type of the network connection setting information to be stored in the portable information terminal 1.

Furthermore, due to the network connection setting information stored in the information storage function 14, it is not necessary to access the setting information distribution server 2 if another access to the same communication network is desired.

Second Embodiment

A second embodiment according to the present invention is different from the first embodiment in that the NW connection control function 13 has a function of storing in the information storage function 14 the frequency or the date and time of the connections, so as to be related with the network connection setting information of the connected communication networks. Another difference is that the operation to acquire information from the setting information distribution server explained in the first embodiment (refer to FIG. 2) is executed in the establishment of the connection with the network in this embodiment. Functions to conduct the same operation with the first embodiment are provided with the same numerals used in FIG. 1, and explanation thereof will be omitted.

The portable information terminal 1 in this embodiment is installed with a network connection setting program. When the network connection setting program is executed, a communication network having an access point in the vicinity is scanned in the network connection process, so that the information acquisition process is executed on the basis of the communication network information associated with the access point(s) obtained as the scan result (that is, a request for the network connection setting information is issued to the setting information distribution server 2 that distributes network connection setting information, which is information indicative of settings of connections with communication networks, the request being accompanied by the communication network information associated with the access point(s) obtained as the scan result). Since the network connection setting information received from the setting information distribution server 2 is access setting information of the communication network(s) associated with the access point(s) in the vicinity which is obtained as the scan result, the network connection control process is executed to extract a communication network(s) connectable to a computer on the basis of the network connection setting information. In the network connection setting process, screen information about a list of communication networks with access points of the communication networks existing in the vicinity of the portable information terminal 1 is generated. In the network connection setting process, when the network connection setting information containing information about the communication network name (s) is received by the information acquisition process, the communication network name is extracted from the network connection setting information.

Additionally, when the communication network name(s) is extracted in the network connection process, the network connection setting program installed onto the portable information terminal 1 causes the portable information terminal 1 to generate screen information about a list of the communication network names. In the network connection control process, screen information about a list of communication networks is generated in such a manner that the communication networks are displayed on the screen in descending order of the frequency of the connections with the computers or the recency of the connections. When the screen information is generated in the network connection control process, a display control process is executed to display the screen information on the display means of the portable information terminal 1. In the display control process, information to specify a communication network to be connected is generated in accordance with a user operation. Then, a connection with a communication network is established in the network connection process on the basis of the information to specify the communication network to be connected, and information to specify another communication network to be connected is generated in the display control process in accordance with a user operation while a connection with one communication network is established, so that the connection with the other communication network is established in the network connection process after the cutoff of the connection with the one communication network on the basis of the information to specify the other communication network to be connected. Information indicating to cut off the connection with the communication network is generated in the display control process in accordance with the user operation while the connection with the communication network is kept established, and the connection with the communication network is cut off in the network connection process on the basis of the information indicating to cut off the connection with the communication network, so that the information acquisition process causes network connection setting information storage means which stores the network connection setting information received from the setting information distribution server 2, to execute a network connection setting information storage process to store the network connection setting information.

A description is given of an operation in the second embodiment of the present invention in the following. The operation in the second embodiment of the present invention can be divided into network connection setting information acquisition, network connection, network cutoff, and network switching.

The operation in the network connection setting information acquisition in the second embodiment of the present invention is performed as a part of the NW connection function, which is different from the operation in the network connection setting information acquisition in to the first embodiment. Furthermore, the network connection setting information transmitted from the setting information distribution server 2 contains either one or both of the number of times of connections and the date and time of connections. Moreover, values indicative of the number of times of connections and the date and time of connections are set to zero immediately after the portable information terminal 1 receives the network connection setting information from the setting information distribution server 2.

Figure 9:
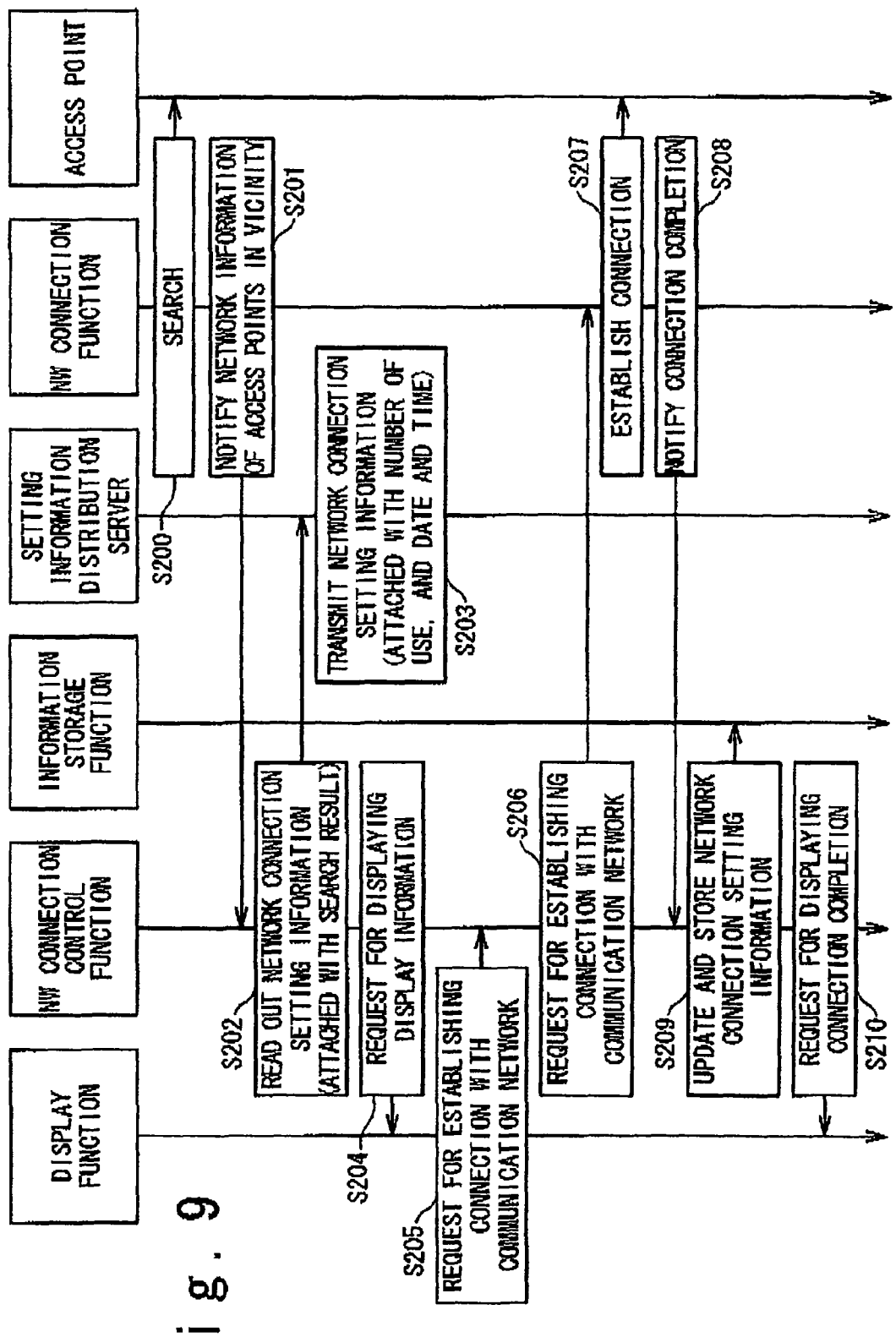
FIG. 9 is a sequence diagram explaining a network connection in a second embodiment of the present invention.

A description is given of the network connection in the following. FIG. 9 is a sequence diagram to explain the network connection in the second embodiment of the present invention.

The NW connection function 15 of the portable information terminal 1 searches (scans) an access point(s) 31 existing in the vicinity to acquire network information thereof (an ESS-ID or the like in the case of an access point of a wireless LAN) (Step S200).

The NW connection function 15 notifies the NW connection control function 13 of the acquired network information (Step S201). If multiple access points exist in the vicinity of the portable information terminal 1, multiple pieces of the network information are notified.

The NW connection control function 13 requests the setting information distribution server 2 to distribute the network connection setting information. At this time, the request is attached with the network information associated with the access point(s) existing in the vicinity which is obtained as the search result (Step S202). As a result, the setting information distribution server 2 reads out the network connection setting information associated with to the attached network information so as to distribute to the source of the request (Step S203). The network connection setting information here contains either one or both of the number of times of connections and the date and time of connections.

The NW connection control function 13 determines the network connection setting information distributed from the setting information distribution server 2 as the communication network connectable to the portable information terminal 1, and prepares list display information. The NW connection control function 13 also stores the network connection setting information distributed from the setting information distribution server 2 in the information storage function 14.

The NW connection control function 13 generates the display information on the ground of "the number of times of connections" or "the date and time of connections" that are contained in the network information notified in the step S201 and the network connection setting information distributed in the step S203. Specifically, when there is a plurality of communication networks which are connectable at present and for which the network connection setting information associated therewith is prepared, for example, the display information is generated under conditions that the communication networks are displayed in descending order of the frequency of the connections or in descending order of the recency of the connections.

A display information generating policy is set to or installed onto the NW connection control function 13 in advance for the NW connection control function 13 to determine whether the frequently connected communication networks come first or the recently connected communication networks come first in the arrangement, so that the NW connection control function 13 generates the display information in accordance with the display information generating policy.

The NW connection control function 13 outputs the generated display information to the display function 12, and requests for displaying the generated display information on the display means (step S204).

The display function 12 displays the communication network list screen, which is the screen based on the display information outputted from the NW connection control function 13, on the display means. When a list of communication networks is displayed on the display means, a user selects the communication network to be connected from the list. The display function 12 notifies the NW connection control function 13 of the communication network selected by the user, and request for establishing the connection (step S205).

When the request for establishing a connection with the communication network selected by the user is received, the NW connection control function 13 outputs the request to the NW connection function 15 (step S206).

When the connection request outputted to the NW connection function 15 by the NW connection control function 13 indicates the communication network name, the NW connection function 15 generates the network connection setting information identified by the communication network name from the information storage function 14. The NW connection function 15 establishes a connection with the access point 31 on the basis of the read network connection setting information. When the connection request outputted to the NW connection function 15 by the NW connection control function 13 is the network connection setting information, the NW connection function 15 establishes a connection with the access point 31 on the basis of the network connection setting information (step S207).

After the connection with the access point 31 is established, the NW connection function 15 outputs a connection completion notice to the NW connection control function 13 (step S208).

The NW connection control function 13 executes a process of updating the network connection setting information of the connection. Specifically, the network connection setting information is stored in the information storage function 14 with the number of times of connections increased and with the date and time of connections rewritten to the latest ones (step S209).

Upon receiving the connection completion notice, the NW connection control function 13 generates connection completion display information which is information to indicate that the connection with the access point 31 is established, and outputs the generated connection completion display information to the display function 12 to request for displaying the information that the connection with the access point 31 is established (Step S210). The display function 12 displays on the display means that the connection with the access point 31 is established on the basis of the connection completion display information outputted by the NW connection control function 13.

The operation of the cutoff of the connection with the communication network in the present embodiment is same as that in the first embodiment, and therefore an explanation thereof will be omitted.

Figure 10:
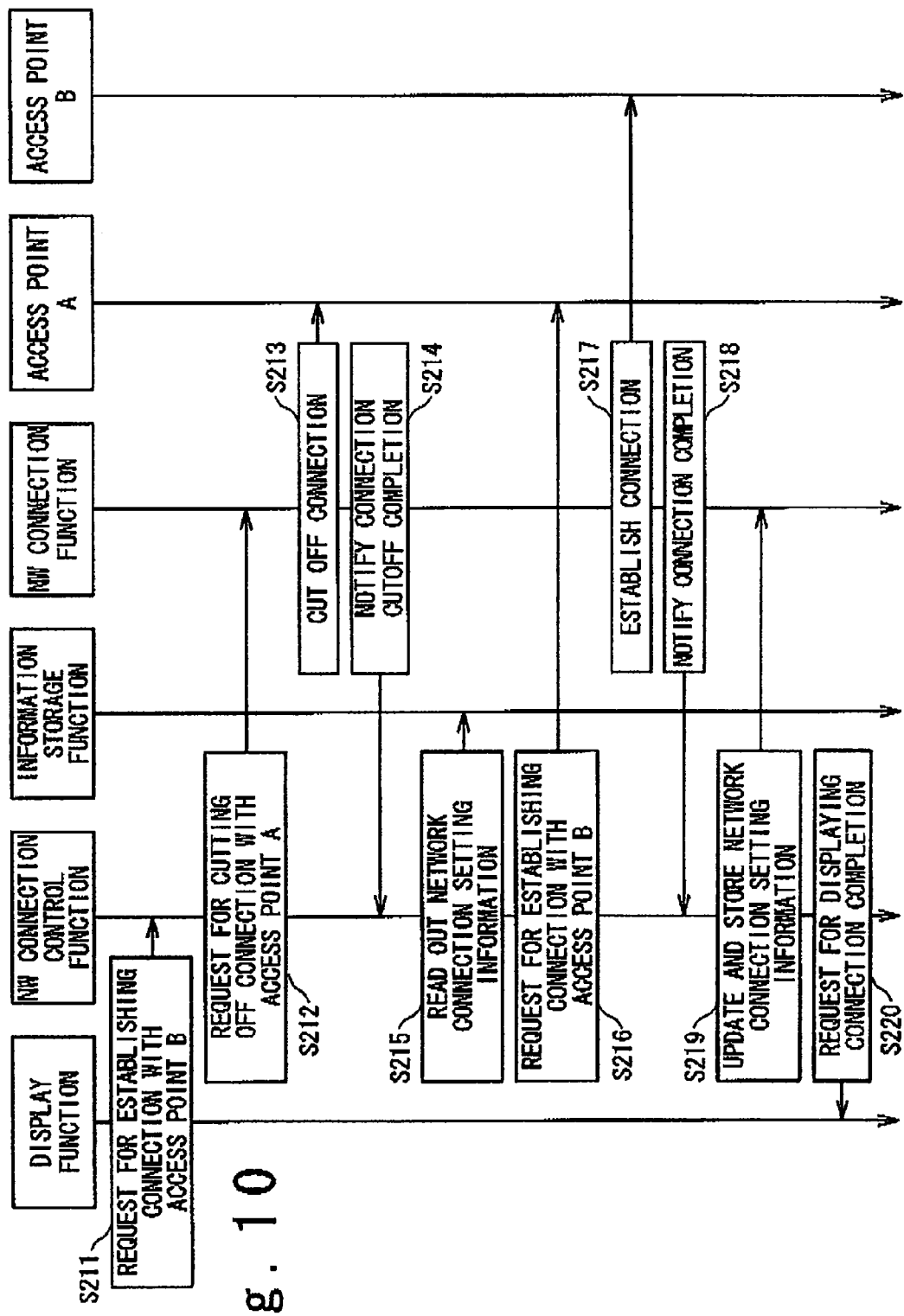
FIG. 10 is a sequence diagram explaining the case of switching communication networks to be connected in the second embodiment of the present invention.

A description is given of the case of switching the communication network to be connected in the following. FIG. 10 is a sequence diagram to explain the case of switching the communication network to be connected in the second embodiment of the present invention.

Explanation is given here using an example of a process in the case of switching the connection to the B network when the portable information terminal 1 is connected with the A network.

The user operates the operation unit of the portable information terminal 1 to display the screen such as the example shown in FIG. 5 in the display means via the display function 12. At this time, the display function 12 may read out network connection setting information stored in the information storage function 14 to determine display order of communication networks on the screen in view of "the number of times of connections" or "the date and time of connections" on the basis of the read network connection setting information.

When the user operates the operation unit to select, for example, the B network on the screen, the display function 12 outputs a connection request (switch request) to the NW connection control function 13 to notify the selection (Step S211). The output process at this time is the same with that of the Step S205, and therefore the explanation thereof is omitted.

Upon receiving the connection request, the NW connection control function 13 determines whether or not there is a communication network which is connected at present. When determining that there is a connected communication network, the NW connection control function 13 forwards a cutoff request to the NW connection function 15 (Step S212).

Upon receiving the cutoff request, the NW connection function 15 executes the cutoff process (Step S213). At this time, the NW connection function 15 may notify the access point A of the cutoff of the connection.

When the cutoff process is completed, the NW connection function 15 outputs a cutoff completion notice to the NW connection control function 13 (Step S214).

When the connection with the communication network currently connected is cut off, the NW connection control function 13 reads out from the information storage function 14 the network connection setting information of the communication network indicated by the connection request outputted to the NW connection control function 13 by the display function 12 at the Step S211 (Step S215). Then, the NW connection control function 13 outputs, to the NW connection function 15, a connection request to establish a connection with the communication network indicated by the connection request outputted to the NW connection control function 13 by the display function 12 at the step S211 (Step S216). In this description, it is assumed that the communication network indicated by the connection request outputted to the NW connection control function 13 by the display function 12 at the step S211 is the communication network having the access point B.

When the connection request outputted to the NW connection function 15 by the NW connection control function 13 indicates the communication network name, the NW connection function 15 reads out the network connection setting information identified by the communication network name from the information storage function 14. The NW connection function 15 establishes a connection with the access point B on the basis of the network connection setting information read out. When the connection request outputted to the NW connection function 15 by the NW connection control function 13 is network connection setting information, the NW connection function 15 establishes a connection with the access point B on the basis of the network setting information (Step S217).

After the connection with the access point B is established, the NW connection function 15 outputs a connection completion notice to the NW connection control function 13 (Step S218).

The NW connection control function 13 executes a process of updating the network connection setting information used for the connection. Specifically, the number of times of connections is increased or the date and time of connections are rewritten to the latest ones, and the information storage function 14 is requested to store the network connection setting information (Step S219). Values updated at this step (step S219) are read by the display function 12 at the step S215 in the next connection.

Upon receiving the connection completion notice, the NW connection control function 13 generates connection completion display information, which is information indicating that the connection with the access point B is established, and outputs the generated connection completion display information to the display function 12 to request for displaying the information that the connection with the access point B is established (Step S220). The display function 12 displays on the display means that the connection with the access point B is established on the basis of the connection completion display information outputted by the NW connection control function 13.

In this embodiment, a communication network with which the connection is established more frequently or more recently is arranged to come first on the displayed communication network list screen, as already explained. This order is an order using history such as frequent utilization and recent utilization, in which a high probability of being selected by the user in the next utilization is considered, and the display of the name of the communication network desired to be connected at the forefront allows the user to easily select the communication network.

The second embodiment is explained above as the operation of issuing a request for the network connection setting information to the setting information distribution server 2 which distributes the network connection setting information, which is information indicative of settings of connections with the communication networks, with which request the communication network information associated with to the access point(s) obtained as the scan result is attached; however, it is obvious that those skilled in the art would easily understood that the point that the NW connection control function 13 has a function of storing in the information storage function 14 the frequency and the date/time of connections so as to be related with the network connection setting information of the connected communication network may be applied to the operation of the process of comparison between the network connection setting information received in advance from the setting information distribution server 2 and the communication network information associated with to the access point (s) obtained as the scan result as explained in the first embodiment.

Third Embodiment

Figure 11:
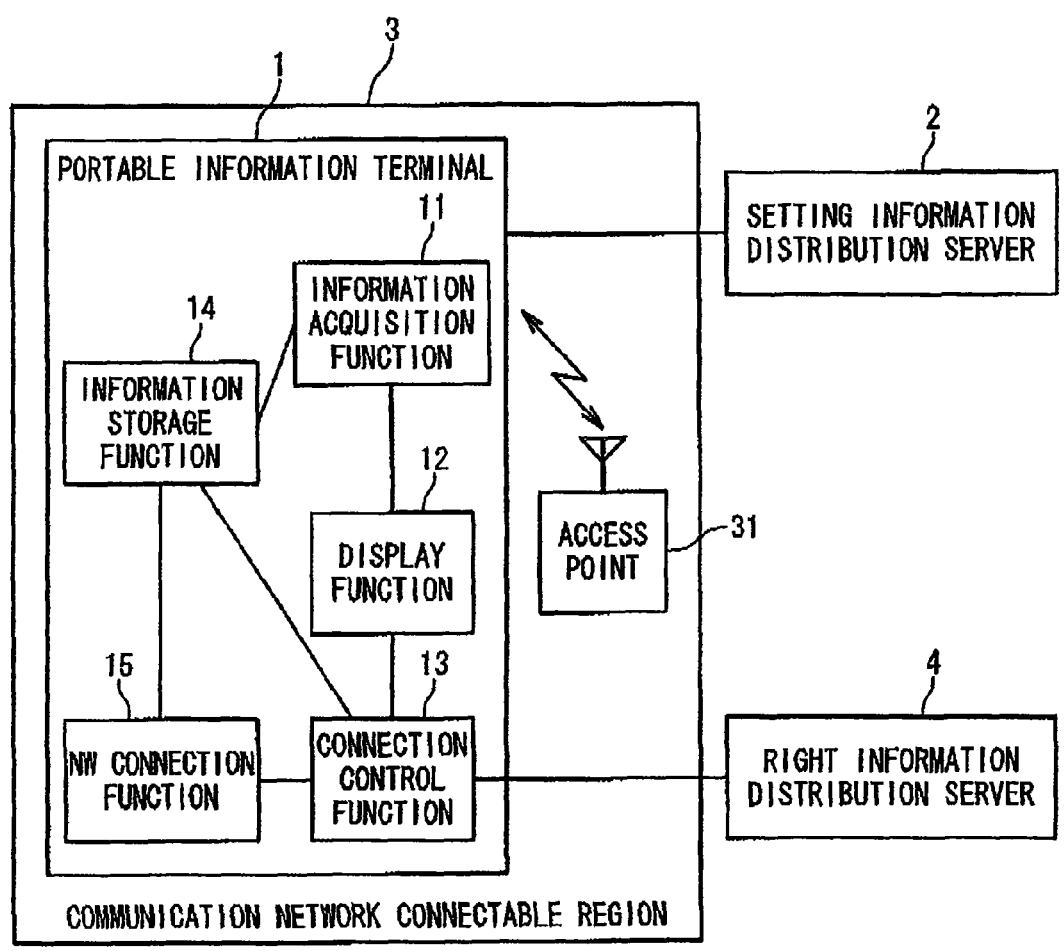
FIG. 11 is a block diagram showing an example of the configuration in a third embodiment of the present invention.

A third embodiment of the present invention will be explained referring to drawings. FIG. 11 is a block diagram showing an example of the configuration in the third embodiment of the present invention. Referring to FIG. 11, the different from the first embodiment is that a right information distribution server 4 is included, which is a server that issues network right information containing information indicating the right to establish a connection with the access point of the communication network and distributes the network right information to the portable information terminal 1. Therefore, functions or the like that are similar to those of the first embodiments are denoted by the same numerals as those used in FIG. 1, and explanations thereof will be omitted. The right information distribution server 4 is a server including generation means adapted to generate the network right information, storage means adapted to store the network right information, and distribution means adapted to distribute the network right information to the portable information terminal 1. A public portable telephone communication network, the wireless LAN, and infrared ray communication or the like are used for communication between the portable information terminal 1 and the right information distribution server 4, for example. The setting information distribution server 2 and the right information distribution server 4 may be realized by the same server.

The portable information terminal 1A is installed with a network connection setting program. When the network connection setting program is executed, processes to be executed includes a information acquisition process to receive network connection setting information, which is information indicative of settings of connections with the communication networks, from the setting information distribution server 2, which distributes the network connection setting information, and a network connection process to establish a connection with the communication network on the basis of the received network connection setting information. In the network connection process, communication networks having an access point in the vicinity are scanned, and a network connection control process is executed to extract communication networks connectable to a computer on the basis of the received network connection setting information and the result of the scanning performed in the network connection process. Then, in the network connection control process, screen information about a list of communication networks indicating the existence of the network connection setting information and the existence of an access point of a communication network in the vicinity of the portable information terminal 1 is generated for each of the extracted communication networks. In information acquisition process of the network connection process, screen information is generated so that the screen information excludes a communication network which does not have the network connection setting information thereof received. In the information acquisition process of the network accessing processing, when network connection setting information further containing information about the name of the communication network is received, the communication network name is extracted from the network connection setting information.

The network connection setting program installed onto the portable information terminal 1 causes the portable information terminal 1 to generate screen information about a list of the communication network names after extracting the information about the communication network name in the network connection process. In the network connection control process, screen information about a list of communication networks is generated in such a manner that the communication networks can be displayed on the screen in descending order of the frequency of connections with a computer or in descending order of the recency of connections with the computer. When the screen information is generated in the network connection control process, the display control processing is executed to display the screen information on the display means of the portable information terminal 1, so that information to specify the communication network to be connected is generated in the display control process in accordance with an user operation, and a connection with the communication network is established in the network connection process on the basis of the information to specify the communication network to be connected. Information to specify another communication network to be connected is generated in the display control process in accordance with the user operation while a connection with one communication network is kept established, and the connection with the one communication network is cut off to establish the connection with the other communication network in the network connection process on the basis of the information to specify the other communication network to be connected. Information indicating to cut off the connection with the communication network is also generated in the display control processing in accordance with the user operation while the connection with the communication network is kept established, and the connection with the communication network is cut off in the network connection process on the basis of the information indicating to cut off the connection with the communication network, so that a network connection setting information storage process is executed in the information acquisition process to allow the network connection setting information storage means which stores the network connection setting information received from the setting information distribution server 2, to store the network connection setting information.

Additionally, the network connection setting program installed onto the portable information terminal 1 also allows the portable information terminal 1 to receive network right information containing information indicating the right to establish a connection with a communication network, from the right information distribution server 4 which distributes the network right information in the information acquisition process. In the information acquisition process, when the network right information is received from the right information distribution server 4, the network connection setting information is received from the setting information distribution server 2, so that the network connection setting information and the network right information are received and scanned by the network connection process in the information acquisition process. When the scan result indicates that there are multiple communication networks with access points existing in the vicinity of the portable information terminal 1, a connection is established with a communication network which is most frequently connected with the portable information terminal 1, or a communication network which is most recently connected with the portable information terminal 1. When the scan result indicates that there is only a single communication network with an access point existing in the vicinity of the portable information terminal 1, a connection is established with the communication network. In the network connection control process, screen information is generated to indicate the existence of the network connection setting information, the existence of the network right information, and the existence of the access point of the communication network in the vicinity of the portable information terminal for each communication network on the basis of the network connection setting information, the network right information, and the scan result. In the information acquisition process of the network connection process, screen information is generated to exclude a communication network which fails to have the network connection setting information or the network right information received. In the information acquisition process of the network connection process, when the network right information containing the name of the communication network is received, the communication network name is extracted from the network right information in the network connection process, so that the communication network name is extracted to generate screen information on a list of the communication network names in the network connection process.

Additionally, the network connection setting program installed onto the portable information terminal 1 causes the portable information terminal 1 to transmit information indicating the scan result to the setting information distribution server 2 in the network connection process, to receive the network connection setting information associated with the information indicating the scan result from the setting information distribution server 2 in the information acquisition process, and to receive the network right information containing information indicating the communication network associated with the network right information in the information acquisition process, so that a table storage process is executed to store a table which relates the network right information and access points of communication networks with the network connection setting information on the basis of the network right information and the network connection setting information of communication networks received from the setting information distribution server 2.

Additionally, the network connection setting program installed onto the portable information terminal 1 also causes the portable information terminal 1 to receive information indicating the scan result obtained in the network connection process and the network right information containing information indicating the communication network associated with the network right information in the information acquisition process, so that the information indicating the scan result and the information indicating the communication network(s) associated with the network right information should are transmitted to the setting information distribution server 2. Additionally, the network connection setting information associated with the information indicating the scan result and the information indicating the communication network(s) associated with the network right information may be received from the setting information distribution server 2, and a table storage process may be executed to store a table in which the network connection setting information of a connectable communication network(s) is related with the network right information and access points of communication networks.

The setting information distribution server 2 is installed with a setting information distribution program. When the setting information distribution program is executed, the setting information distribution server 2 causes a computer with a function of establishing a connection with a communication network, to execute a storage process of storing in the storage means network connection setting information, which is information indicative of settings of connections with communication networks, and a transmission/reception process of distributing the network connection setting information to an information terminal. In the transmission/reception process, user information that is information to specify the user is distributed to the information terminal. In the storage process, a table relating communication networks with the network connection setting information is also stored in the storage means. In the transmission/reception process, when information indicating a communication network having an access point in the vicinity of the information terminal is received from the information terminal, the network connection setting information relating communication networks having an access point in the vicinity of the information terminal is transmitted to the information terminal on the basis of the table stored in the storage means. Moreover, in the transmission/reception process, when the information indicating a communication network having an access point in the vicinity of the information terminal and information indicating the communication network associated with the network right information are received from the information terminal, the network connection setting information associated with a communication network which has an access point in the vicinity of the information terminal and is associated with the network right information may be transmitted to the information terminal on the basis of the table stored in the storage means.

The right information distribution server 4 is installed onto a right information distribution program to execute a storage process of generating network right information, which is information indicating the right to establish a connection with an access point of a communication network, and storing the network right information in the storage means, and a distribution process of distributing the network right information to the portable information terminal 1, so that the network right information containing information indicating the communication network(s) associated with the network right information is distributed to the information terminal in the distribution process.

A description is given of an operation in the third embodiment of the present invention in the following. The operation in the third embodiment of the present invention can be divided into network right information acquisition, network connection setting information acquisition, network connection, network cutoff, network switching, and network right information display.

A description is first given of the network connection setting information acquisition.

The acquisition of the network connection setting information is achieved through the following methods. A first method is to request the setting information distribution server 2 in advance in the information acquisition process, as explained in the first embodiment referring to FIG. 2. A second method is to issue a request attached with the communication network information on the basis of the scan result to the setting information distribution server 2 in the connection setting process so as to exclusively receive the network connection setting information associated with the communication network in the step of the connection setting process, which method is explained in the second embodiment referring to FIG. 9. A third method is to issue to the setting information distribution server 2 a request further attached with information indicating the communication network associated with the network right information received from the right information distribution server 4 so as to exclusively receive the network connection setting information associated with the communication network obtained in the scan result which also has the network right information, which method will be described later. Either one of the above methods may be used to perform the operation.

Figure 12:
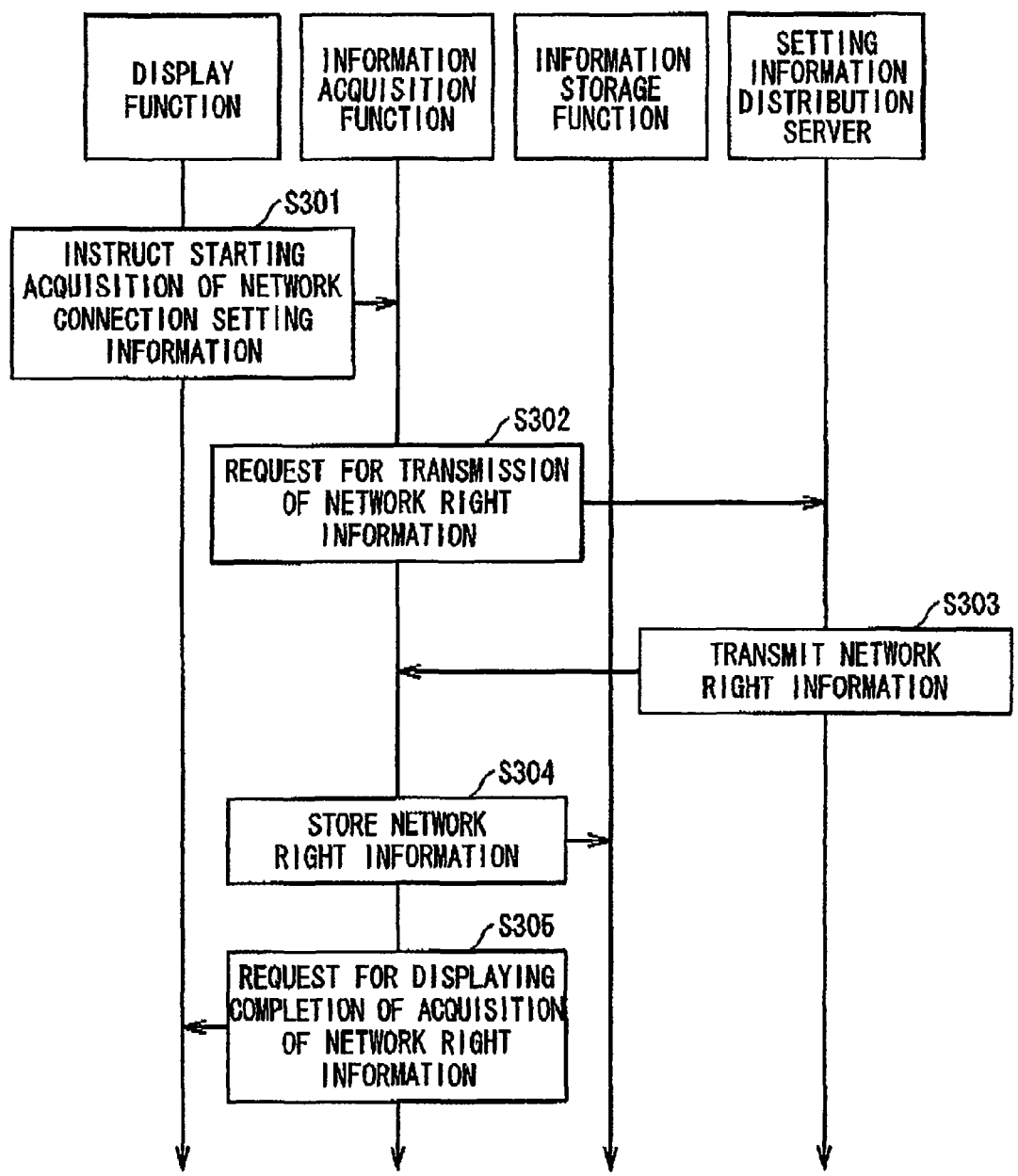
FIG. 12 is a sequence diagram explaining the acquisition of network right information in the third embodiment of the present invention.

FIG. 12 is a sequence diagram to explain the network right information acquisition in the third embodiment of the present invention.

The user of the portable information terminal 1 operates the operation unit of the portable information terminal 1 to allow the display function 12 to display on the display means a network right information acquisition screen, which is a screen to select an instruction to acquire network right information. Here, when the user obtains the network right information by a communication with directivity such as an infrared ray communication, the portable information terminal 1 is first directed to the right information distribution server 4. Then, the user operates the operation unit of the portable information terminal 1 and moves a cursor to a region indicating communication start displayed on the display means or the like so as to select the instruction to acquire the network right information. Then, the display function 12 forwards a network right information acquisition start command, which is a command indicating to receive the network right information from the right information distribution server 4, to the information acquisition function 11 (Step S301).

When the portable information terminal 1 is already connected to, for example, an access point 31 of a communication network connectable region 3 by a wireless LAN or the like and the information storage function 14 stores the network right information which can be acquired in the communication network connectable region 3, the display function 12 display the network right information which can be acquired in the communication network connectable region 3 on the display means. Moreover, when the information storage function 14 stores multiple pieces of the network right information, the display function 12 displays a list thereof on the display means. The user operates the operation unit to select the network right information to be acquired. Then, the display function 12 forwards the network right information acquisition start command to the information acquisition function 11.

At this time, the network right information acquisition start command contains the type of a communication path (ex. a portable telephone network, the wireless LAN, and the infrared ray communication or the like) for acquiring the network right information, and if necessary, an address of the right information distribution server 4, which is the communication destination.

The information acquisition function 11 establishes a connection with the right information distribution server 4 to request for transmitting the network right information on the basis of the network right information acquisition start command forwarded from the display function 12 (Step S302). The right information distribution server 4 transmits the network right information to the portable information terminal 1 in accordance with the request for transmitting the network right information (step S303). In the portable information terminal 1, the information acquisition function 11 receives (acquires) the network right information. The network right information used here is information containing the name of the communication network, the identifier of the communication network, and detailed explanatory information of the communication network. The identifier of the communication network may be anything as long as having a character string which is associated with the network connection setting information as described below, and may be, for example, a serial number, an URI (Uniform Resource Identifier) or the like of the communication network that is set by an administrator of the communication network in advance. The detailed explanatory information of the communication network is information specifying the communication network with which the network right information donates the right to establish a connection, and exemplified by an indication such as "this communication network information is information which allows establishing a connection with an access point of a communication network shop B of a company A". The network right information may also contain network authentication information (a WEP key and a password or the like in the case of the wireless LAN).

Upon acquiring the network right information, the information acquisition function 11 forwards the information to the information storage function 14, so that the information storage function 14 stores the forwarded network right information (Step S304).

After forwarding the network right information to the information storage function 14, the information acquisition function 11 requests the display function 12 to display on the display means a screen indicating that the process of acquiring the network acquisition information is completed (Step S305). The display function 12 displays the screen indicating that the process of acquiring the network acquisition information is completed on the display means.

Next, the portable information terminal 1 acquires network connection setting information from the setting information distribution server 2. Although the operations of the respective functions in the case that the portable information terminal 1 acquires the network connection setting information from the setting information distribution server 2 are similar to those in the respective functions in the first embodiment in the case when the portable information terminal 1 acquires the network connection setting information from the setting information distribution server 2, the network connection setting information in the third embodiment contains a network identifier, differently from the first embodiment. Accordingly, the network connection setting information in this embodiment contains the communication network name, the communication network identifier, the network information, and the network authentication information. When the network right information contains information on the communication network name, the network connection setting information may not include information on the communication network name. However, information on the communication network name needs to be contained in the network connection setting information, when it is desired to display on the portable information terminal 1 the name of a communication network in which the network right information does not exist. Moreover, the network connection setting information may not contain the network authentication information, when the network right information contains the network authentication information.

Figure 13:
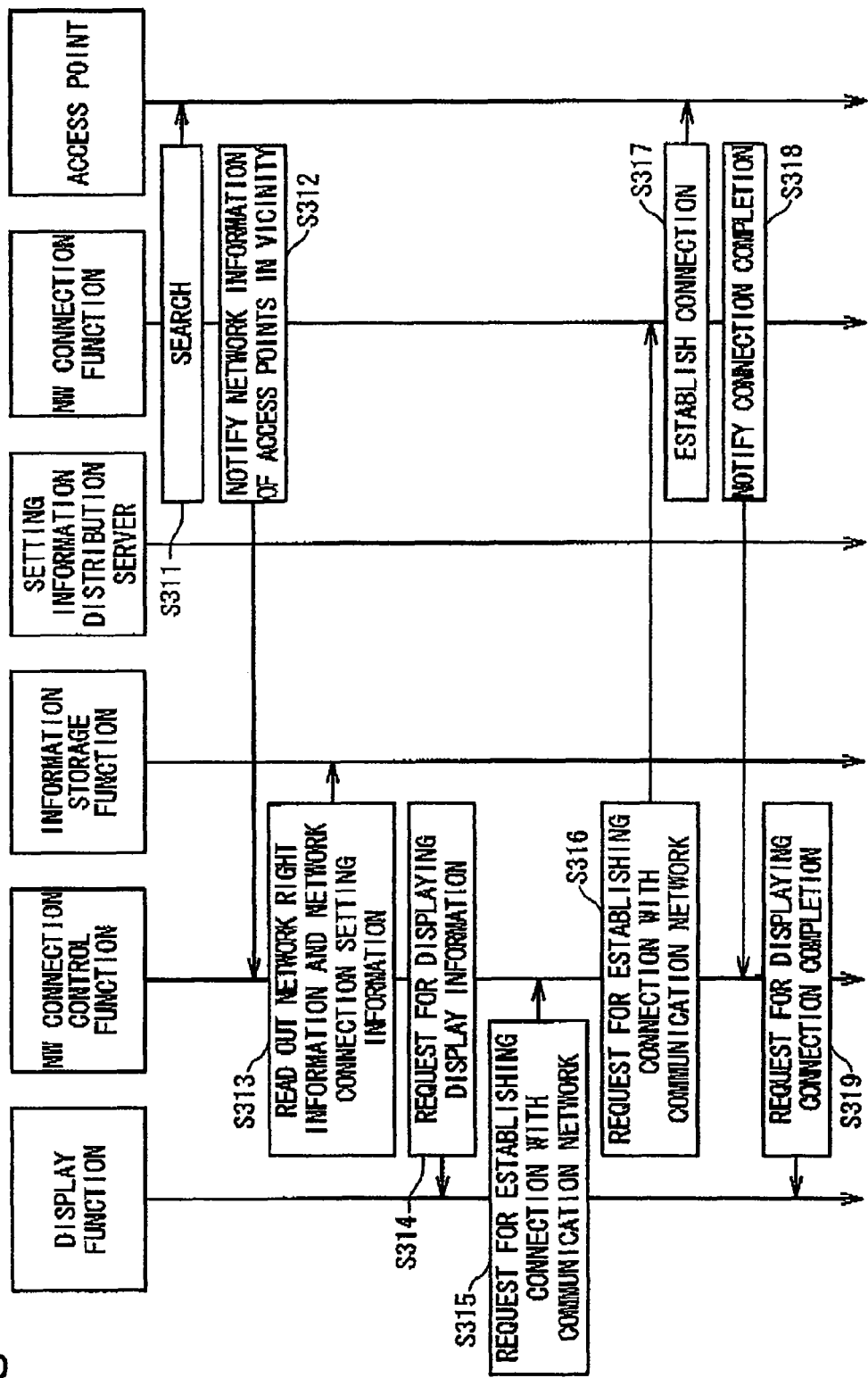
FIG. 13 is a sequence diagram explaining the network connection in the third embodiment of the present invention.

A description is next given of the network connection. FIG. 13 is a sequence diagram to explain the network connection in the third embodiment of the present invention. It is assumed in the explanation for the operation that the network connection setting information is obtained in advance by requesting the setting information distribution server 2, as explained in the first embodiment.

The NW connection function 15 in the portable information terminal 1 searches (scans) an access point(s) 31 existing in the vicinity to acquire network information thereof (the ESS-ID or the like in the case of the access point of the wireless LAN) (Step S311).

The NW connection function 15 notifies the NW connection control function 13 of the acquired network information (Step S312). If there are multiple access points existing in the vicinity of the portable information terminal 1, multiple pieces of the network information are notified.

The NW connection control function 13 reads out the network right information and the network connection setting information stored in the information storage function 14 (Step S313).

The NW connection control function 13 determines a communication network(s) to be connectable when three kinds of information are prepared for the communication network(s): the network information notified by the NW connection function 15, the network right information read from the information storage function 14, and the network connection setting information, and extracts such communication network(s). The network connection setting information contains the network information, and therefore it is easy to extract network setting information of the communication network(s) existing in the vicinity. Additionally, since the network connection setting information and the network right information are associated with each other by an identifier of a communication network contained in the respective information, the network connection setting information and the network right information are paired information in the case of having the same communication network identifier. In this extracting process, a classification is made as follows:

NW information A: the communication network(s) with the network right information, the network connection setting information, and an access point existing in the vicinity.

NW information B: the communication network(s) with the network right information, the network connection setting information, and without any access point existing in the vicinity.

NW information C: the communication network(s) with the network right information, without the network connection setting information, and with the access point existing in the vicinity.

NW information D: the communication network(s) without the network right information, and with the network connection setting information and the access point existing in the vicinity NW information E: the communication network(s) without the network right information, with the network connection setting information, and without any access point existing in the vicinity.

NW information F: the communication network(s) without the network right information and the network connection setting information, but with the access point existing in the vicinity.

The NW connection control function 13 further generates display information for displaying the NW information A. In this case, the NW connection control function 13 extracts the communication network name from the network right information or the network connection information. The display information contains, instead of the network information received from the NW connection function 15, the network communication name contained in the network right information or the network setting information read out from the information storage function 14, which potentially allows the user to easily recognize the communication network. Moreover, when multiple communication networks are classified as the NW information A, the display information contains a list of the communication network names. The NW connection control function 13 may also generate display information for displaying the NW information A and the NW information B. When the NW information A and the NW information B are contained in the display information, the portion of the display information associated with the NW information A contains information indicating that the access point of the communication network is confirmed to exist in the vicinity, while the portion of the display information associated with the NW information B does not contain the information indicating that the access point of the communication network is confirmed to exist in the vicinity.

Furthermore, the display information generated by the NW connection control function 13 may be display information for displaying any of the NW information A through the NW information F. A display information generation policy is set or installed onto the NW connection control function 13 in advance by a user of the portable information terminal 1 to specify the display information to be generated by the NW connection control function 13 from among the NW information A through the NW information F, so that the NW connection control function 13 generates the display information in accordance with the display information generation policy.

The NW connection control function 13 outputs the generated display information to the display function 12, and requests for displaying to the display means (Step S314).

The display means 12 displays a communication network list screen, which is a screen based on the display information outputted by the NW connection control function 13, on the display means. The display information contains information on the connectable communication network. The display function 12 may also display a list of a plurality of communication networks and the communication network which is not connectable on the display means. When the display means displays the list of a plurality of communication networks, a user selects the communication network to access from the list. The display function 12 notifies the NW connection control function 13 of the communication network selected by the user to request for establishing a connection (Step S315). When the display function 12 displays communication networks classified as the NW information A through the NW information F in displaying the list of a plurality of communication networks on the display means, the following methods are used, for example.

Display A: a display indicating the communication network name accompanied by an icon meaning connectable, and the existence of the network right information.

Display B: a display indicating the communication network name and the existence of the network right information.

Display C: a communication network display indicating the existence of the network right information and meaning that details of the communication network are unknown.

Upon receiving the request for establishing the connection with the communication network selected by the user is received, the NW connection control function 13 outputs the request to the NW connection function 15 (Step S316).

When the connection request outputted to the NW connection function 15 by the NW connection control function 13 indicates the communication network name, the NW connection function 15 reads out the network connection setting information identified by the communication network name from the information storage function 14. The NW connection function 15 establishes a connection with an access point 31 on the basis of the read network connection setting information. When the connection request outputted to the NW connection function 15 by the NW connection control function 13 is the network connection setting information, the NW connection function 15 establishes a connection with the access point 31 on the basis of the network connection setting information (Step S317).

After establishing the connection with the access point 31, the NW connection function 15 outputs an connection completion notice to the NW connection control function 13 (Step S318).

Upon receiving the connection completion notice, the NW connection control function 13 generates connection completion display information, which is information indicating that the connection with the access point 31 is established, and outputs the generated connection completion display information to the display function 12 to request for displaying the information indicating that the connection with the access point 31 is established (Step S319). The connection completion display information may contain information on the communication network which is currently connected, and information on a communication network which is not connected. The display function 12 displays on the display means that the connection with the access point 31 is established on the basis of the connection completion display information outputted by the NW connection control function 13.

It should be noted that, when the information acquisition function 11 receives the network connection setting information and the network right information, and the result of the scanning by the NW connection function 15 indicates that there are multiple communication networks with an access point existing in the vicinity of the portable information terminal 1, the NW connection function 15 establishes a connection with the communication network with which the portable information terminal 1 is most frequently connected, or the communication network with which the portable information terminal 1 is most recently connected. When the information acquisition function 11 receives the network connection setting information and the network right information, and the result of the scanning by the NW connection function 15 indicates that there is only a single communication network with an access point existing in the vicinity of the portable terminal 1, the NW connection function 15 may establishes a connection with the single communication network. At this time, the NW connection control function 13 does not generate the display information.

The operations in the respective functions in the cutoff of the network are similar to those in the respective functions in the first embodiment in the cutoff of the network, and therefore the explanation thereof is omitted.

The operations in the respective functions in switching networks are similar to those in the respective functions in the first embodiment in switching the networks, and therefore the explanation thereof is omitted.

Figure 14:
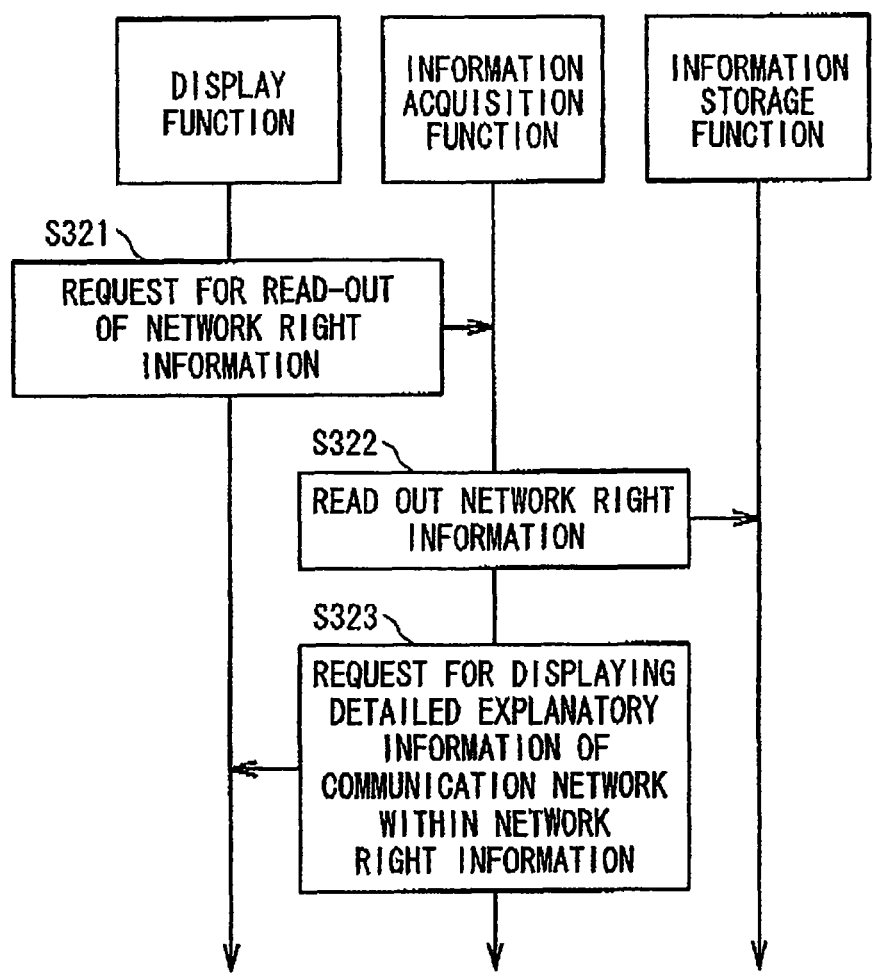
FIG. 14 is a sequence diagram explaining an operation to display the network right information in the third embodiment of the present invention.

A description is next given of an operation in displaying the network right information referring to the drawings. FIG. 14 is a sequence diagram explaining the operation in displaying the network right information in the third embodiment of the present invention.

A user of the portable information terminal 1 operates the operation unit of the portable information terminal 1, and thereby allows the display function 12 to display the list of the communication network names contained in the network right information on the display means. At this time, the display function 12 reads out from the information storage function 14 the communication network names contained in the network right information stored in the information storage function 14 with the communication network names and the network right information related with each other by the identifiers of the communication networks. Then, the user operates the operation unit of the portable information terminal 1 to select an instruction to display the network right information from among the communication network names displayed on the display means by moving a cursor or the like to a region indicating the name of the communication network of which the user desires to known the details. The display function 12 then outputs, to the information acquisition function 11, a request for reading out the network right information identified by the communication network identifier associated with the communication network name selected by the user (step S321).

The information acquisition function 11 reads out from the information storage function 14 the network right information identified by the inputted network identifier (Step S322). Here, the information acquisition function 11 reads the entire network right information or detailed explanatory information of the communication network contained in the network right information.

The information acquisition function 11 outputs the detailed explanatory information of a communication network which was read to the display function 12, and requests for displaying the detailed explanatory information on the display means (step S323). The display function 12 displays the inputted information on the display means of the portable information terminal 1.

As described above, in this embodiment, the network connection setting information is divided into the network right information and the network connection setting information, differently from the first embodiment. Therefore, the connection with the communication network is not established when both of the information does not exist in the portable information terminal 1. Additionally, the fact that the network setting information is divided allows a flexible distribution of the respective pieces of the information. For example, the network connection setting information may be freely distributed to some extent, while the network right information is distributed only after the user pays the usage charge of the communication network.

When it is desired to change the network information contained in the network connection setting information without changing information contained in the network right information, only the network connection setting information may be redistributed.

Furthermore, when it is desired to add or change the detailed explanatory information of the communication network, only the network right information may be redistributed, since the network right information includes the detailed explanatory information of the communication network and the network connection setting information does not include the detailed explanatory information.

It should be noted that the setting information distribution server 2 may make inquiries to the portable information terminal 1 whether or not the network right information is stored in the portable information terminal 1 before distributing the network connection setting information to the portable information terminal 1, so that the network connection setting information is distributed to the portable information terminal 1 when the network right information is stored in the portable information terminal 1. This allows a company and a store or the like that issue the network right information to provide the communication network connection service only for users of the portable information terminal 1 in which the network right information is prepared.

In this case, for example, the network connection setting information contains an identifier which specifies the network connection setting information, and the network right information contains an identifier which specifies the network right information and information on the identifier of the network connection setting information associated therewith, while the network information contains an identifier that specifies the corresponding communication network. This allows relating the network connection setting information, the network right information and the network information with one another by using the identifier of the network connection setting information, the identifier of the network right information, and the identifier of the network information. This allows specifying the network connection setting information of the communication network associated with the network right information and the network information.

Also, for example, the network connection setting information contains an identifier which specifies the network connection setting information, and the network right information contains an identifier which specifies the network right information and information on the identifier of the network connection setting information associated therewith, while the network information contains an identifier which specifies the corresponding network. Additionally, the information storage function 14 stores a table relating the respective identifiers with one another. This allows specifying the network connection setting information of the communication network associated with the network right information and the network information, on the basis of the table stored in the information storage function 14.

Further, for example, the setting information distribution server 2 stores a table relating the network information with the network connection setting information, and the network information contains information indicating the associated network right information, so that the portable information terminal 1 transmits, to the setting information distribution server 2, the network information associated with the network right information received from the right information distribution server 4. This allows the portable information terminal 1 to establish the connection with the communication network, after the setting information distribution server 2 distributes to the portable information terminal 1 the network connection setting information associated with the received network information on the basis of the stored table.

Moreover, for example, the setting information distribution server 2 stores a table relating the network right information, the network information and the network connection setting information with one another, and the portable information terminal 1 transmits the network information to the setting information distribution server. Additionally, the setting information distribution server 2 determines whether or not the network right information associated with the received network information is stored in the information storage function 14 of the portable information terminal 1 on the basis of the stored table, and when the information storage function 14 of the portable information terminal 1 stores the network right information associated with the received network information, the setting information distribution server 2 distributes to the portable information terminal 1 the network connection setting information associated with the network right information stored in the information storage function 14 and the received network information. This allows the portable information terminal 1 to establish the connection to the communication network.

Furthermore, for example, the setting information distribution server 2 stores a table relating the network right information, the network information and the network connection setting information with one another, and the portable information terminal 1 transmits the network right information and the network information to the setting information distribution server. When the setting information distribution server 2 distributes to the portable information terminal 1 the network connection setting information associated with the received network right information and the received network information, this allows the portable information terminal 1 to establish the connection with the communication network.

In the above explanation, the third embodiment is explained as implementing the operation of acquiring the network connection setting information in advance from the setting information distribution server 2 by issuing a request, as explained in the first embodiment. It would be easily understood by those skilled in the art that, as explained in the second embodiment referring to FIG. 9, the third embodiment is also applicable to an operation of issuing a request attached with the communication network information based on the scan result to setting information distribution server 2 in the step of the connection setting process, and receiving only the network connection setting information associated with the communication network; or an operation of issuing a request further attached with the communication network associated with the network right information received from the right information distribution server 4 to the setting information distribution server 2, and receiving only the network connection setting information associated with the communication network which is indicated in the scan result and for which the network right information is prepared.

Fourth Embodiment

A description is given of a fourth embodiment according to the present invention. The configuration in the fourth embodiment of the present invention is similar to the configuration according to the third embodiment, and therefore, servers or the like are denoted by the same numerals as those used in FIG. 11, and the explanations thereof are omitted. It should be noted that the information storage function 14 stores a connection operation policy, which is information indicating an operation when the portable information terminal 1 establishes a connection with the communication network.

The connection operation policy indicates, for example, that the NW connection control function 13 should generate display information on the screen of a list of communication networks for which three kinds of information are prepared including the network information, the network right information and the network connection setting information, that the display information generated by the NW connection control function 13 should be displayed on the display means, that the user should select the communication network to be connected, and that the NW connection function 15 should establish a connection with the communication network selected by the user (referred to as the connection operation policy A, hereinafter).

Another connection operation policy, for example, indicates that the NW connection function 15 should establish a connection with the communication network with which the portable information terminal 1 is most frequently connected or with the communication network with which the portable information terminal 1 is most recently connected, from among communication networks for which three kinds of information are prepared, including the network information, the network right information and the network connection setting information (referred to as the connection operation policy B, hereinafter).

Still another connection operation policy, for example, indicates that, when there are multiple communication networks for which three kinds of information are prepared including the network information, the network right information and the network connection setting information, the NW connection control function 13 should generate display information on the screen of the list of the communication networks, that the display information generated by the NW connection control function 13 should be displayed on the display means, that the user should select the communication network to be connected, and that the NW connection function 15 should establish a connection with the communication network selected by the user. Moreover, the still other connection operation policy indicates that, when there is only a single communication network for which three kinds of information are prepared, including the network information, the network right information and the network connection setting information, the NW connection function 15 should establish a connection with the communication network (referred to as the connection operation policy C hereinafter).

As a method of storing the connection operation policy in the information storage function 14, for example, a provider of the portable information terminal 1 (ex. a manufacturer) stores any one of the connection operation policies A through C in the information storage function 14 in advance. At this time, the information storage function 14 stores the connection operation policy in an unchangeable form.

As another method of storing the connection operation policy in the information storage function 14, for example, a provider of the portable information terminal 1 (ex. manufacturer) stores the connection operation policy A, the connection operation policy B and the connection operation policy C in the information storage function 14 in a form in which the setting of the connection operation policies can be switched by a user operation, while any one of the connection operation policies A through C is used as an initial setting. This allows the user to change the setting of the connection operation policies by operating the portable information terminal 1. The portable information terminal 1 operates on the basis of the connection operation policy in establishing a connection with a communication network.

As still another method of storing the connection operation policy in the information storage function 14, for example, a provider of the portable information terminal 1 (ex. a manufacturer) stores any one of the connection operation policies A through C in the information storage function 14 in a form in which the connection operation policy can not be changed by a user operation. The user brings the portable information terminal 1 to, for example, a manufacturer of the portable information terminal 1 or an after-sales service window operated by a management company of the communication network, and connects the portable information terminal 1 with an external instrument which changes the connection operation policy to change the setting of the connection operation policy.

The setting of the connection operation policy may also be changed by a user operation of the portable information terminal 1 to connect the portable information terminal 1 with a server of a manufacturer of the portable information terminal 1 or a management company of the communication network via the communication network. The portable information terminal 1 operates on the basis of the connection operation policy set when establishing a connection with a communication network.

The portable information terminal 1 is installed with a network connection setting program. When the network connection setting program is executed, the portable information terminal 1 executes an information acquisition process to receive network connection setting information, which is information indicative of settings of connections with communication networks, from the setting information distribution server 2 which distributes the network connection setting information, and executes a network connection process to establish a connection with a communication network on the basis of the received network connection setting information. In the network connection process, a network connection control process is executed to scan a communication network(s) having an access point in the vicinity and to extract a communication network(s) connectable to a computer on the basis of the received network connection setting information and the result of the scanning by the network connection process. In the network connection control process, screen information is generated for each of the extracted communication network(s) on a list of communication networks, indicating the existence of the network connection setting information and the existence of the access point of the communication network in the vicinity of the portable information terminal 1. In the information acquisition process of the network connection process, screen information is generated, excluding the communication network which did not receive the network connection setting information. Furthermore, in the information acquisition process of the network connection process, after the network connection setting information containing information on the name of the communication network is received, the communication network name is extracted from the network connection setting information.

The network connection setting program installed on the portable information terminal 1 also causes the portable information terminal 1 to generate screen information on a list of the communication network names in the network connection process, after extracting the information on the name of the communication network, and to generate screen information on a list of communication networks in the network connection control process in such a manner that communication networks are displayed on the screen in descending order of the frequency of the connections with a computer or in descending order of the recency of the connections with the computer. When the screen information is generated in the network connection control process, a display control process is executed to display on the display means of the portable information terminal 1, and information specifying the communication network to be connected is generated in accordance with a user operation in the display control process, so that a connection with the communication network is established in the network connection process on the basis of the information specifying the communication network to be connected. In the display control process, information specifying another communication network to be connected is generated in accordance with a user operation while a connection with one communication network is kept established, and the connection with the one communication network is cut off in the network connection process, so that a connection with the other communication network is established on the basis of the information specifying the other communication network to be connected. In the display control process, information indicating the cutoff of the connection with the communication network is also generated in accordance with a user operation while the connection with the communication network is kept established, and the connection with the communication network is cut off in the network connection process on the basis of the information indicating the cutoff of the connection with the communication network, so that the information acquisition process causes network connection setting information storage means which stores the network connection setting information received from the setting information distribution server 2 in the information acquisition process, to execute a network connection setting information storage process to store the network connection setting information.

Additionally, the network connection setting program installed onto the mobile information terminal 1 further causes the portable information terminal 1 to receive network right information containing information indicating a right to establish a connection with a communication network from the right information distribution server 4 which distributes the network right information in the information acquisition process. In the information acquisition process, the network connection setting information is received from the setting information distribution server 2 after the network right information is received from the right information distribution server 4, so that the network connection setting information and the network right information are received and a scanning is implemented, in the information acquisition process within the network connection process. When the scan result indicates that there are multiple communication networks with an access point existing in the vicinity of the portable information terminal 1, the portable information terminal 1 is connected with the communication network with which the portable information terminal 1 is most frequently connected or the communication network with which the portable information terminal 1 is most recently connected, and the network connection setting information and the network right information are received in the information acquisition processing. On the other hand, when the scan result indicates that there is only a single communication network with an access point existing in the vicinity of the portable information terminal 1, the portable information terminal 1 is connected with the communication network, and screen information indicating the existence of the network connection setting information, the existence of the network right information, and the existence of the access point of the communication network existing in the vicinity of the portable information terminal 1 is generated in the network connection control process of the respective communication networks on the basis of the network connection setting information, the network right information and the scan result.

In the information acquisition process of the network connection process, screen information excluding the communication network for which either the network connection setting information or the network right information is not received is generated, so that, when the network right information containing information on the name of the communication network is received, the communication network name is extracted from the network right information in the information acquisition process in the network connection process. Finally, in the network connection process, when the information on the communication network names is extracted, screen information on a list of the communication network names is generated.

Moreover, the network connection setting program installed onto the portable information terminal 1 causes the portable information terminal 1 to receive the network connection setting information and the network right information and to scan in the information acquisition process of the network connection process. When the scan result indicates that there is an access point of a communication network existing in the vicinity of the portable information terminal 1, the portable information terminal 1 is operated on the basis of the connection operation policy indicating to establish a connection with a communication network, so that the network connection setting information and the network right information are received by the information acquisition process in the network connection process. On the other hand, when the scan result indicates that there are multiple communication networks with an access point existing in the vicinity of the portable information terminal 1, the portable information terminal 1 is operated on the basis of the connection operation policy indicating to establish a connection with the communication network with which the portable information terminal 1 is connected most frequently or the communication network with which the portable information terminal 1 is most recently connected, and the network connection setting information and the network right information are received in the information acquisition process in the network connection process. Moreover, when the scan result indicates that there are multiple communication networks with an access point existing in the vicinity of the portable information terminal 1, screen information on a list of the communication networks is generated in the network connection control process, and the communication network to be connected is selected by the user, followed by establishing a connection with the communication network selected by the user, and the network connection setting information and the network right information are received in the information acquisition process. Furthermore, when the scan result indicates that there is only a single communication network with an access point existing in the vicinity of the portable information terminal 1, the portable information terminal 1 is operated on the basis of the connection operation policy indicating to establish a connection with the communication network, and operated in the network connection control process and the network connection process on the basis of the connection operation policy in accordance with the connection operation policy setting information, which is information specifying the connection operation policy to be carry out from among the multiple connection operation policies, and the connection operation policy setting information is changed in the information acquisition process in accordance with a user operation, an operation of a connected external instrument or instructions via the communication network.

As described above, this embodiment allows a user or a provider of the portable information terminal 1 to determine an operation when the portable information terminal 1 is connected with the communication network by setting the connection operation policy. Particularly in the case that the connection operation policy B is selected, or in the case that the connection operation policy C is selected and there is only a single communication for which three kinds of information is prepared, including the network information, the network right information, and the network connection setting information, the NW connection function 15 automatically established a connection with the communication network, and therefore an operation of the portable information terminal 1 performed by the user can be further reduced.

In the above-described explanation, the fourth embodiment is explained as implementing the operation to acquire the network connection setting information from the setting information distribution server 2 in advance by issuing a request, as explained in the first embodiment. It would be easily understood those skilled in the art that the fourth embodiment is applicable to an operation in which a request attached with the communication network information based on the scan result is issued to the setting information distribution server 2 to receive only the network connection setting information associated with the communication network in the step of the connection setting process, as explained in the second embodiment referring to FIG. 9, or an operation in which a request further attached with information indicating the communication network associated with the network right information received from the right information distribution server 4 is issued to the setting information distribution server 2 to receive only the network connection setting information associated with the communication network which is indicated in the scan result and for which the network right information is prepared.

Fifth Embodiment

A description is given of a fifth embodiment according to the present invention. The configuration in the fifth embodiment of the present invention is similar to that in the first embodiment, and therefore servers or the like are denoted by the same numerals as those used in FIG. 1, and the explanation thereof is omitted. The portable information terminal 1 may be connected with the right information distribution server 4 in the same manner as the third embodiment.

The information storage function 14 stores user information, which is information identifying the user of the portable information terminal 1. The user information may be stored in the information storage function 14 in advance at the time of the shipping of the portable information terminal 1 from a factory or the like, or the user information may be received in the information acquisition function 11 from the setting information distribution server 2, the right information distribution server 4, or a server having a function of distributing the user information so as to store the received user information in the information storage function 14. The portable information terminal 1 receives the user information by using, for example, a public portable telephone communication network, the wireless LAN and an infrared ray communication or the like.

The user information may indicate that the user is, for example, an employee of a certain company or a registered member of a specific store or the like. The user information is also associated with the network connection setting information. A description is given of a method of relating the user information with the network connection setting information, using specific examples.

For example, the network connection setting information contains an identifier specifying the network connection setting information, while the user information contains information on an identifier of the associated network connection setting information. This allows relating the network connection setting information with the user information by the identifier of the network connection setting information.

Moreover, for example, the user information contains an identifier specifying the user information, while the network connection setting information contains information on an identifier of the associated user information. This allows relating the network connection setting information with the user information by the identifier of the user information.

Furthermore, for example, the network connection setting information contains an identifier specifying the network connection setting information, and the user information contains an identifier specifying the user information, while the information storage function 14 stores a table which indicates an association of the identifier of the network connection setting information with the identifier of the user information. This allows relating the network connection setting information with the user information by using the identifier of the network connection setting information and the identifier of the user information. It should be noted that the information storage function 14 stores the table which indicates the association of the identifier of the network connection setting information with the identifier of the user information in advance at the time of the shipping of the portable information terminal 1 from a factory, or the information acquisition function 11 receives the table which indicates association of the identifier of the network connection setting information with the identifier of the user information from the setting information distribution server 2, the right information distribution server 4, or a server having a function of distributing the user information, and stores the table the information storage function 14. The information acquisition function 11 may also perform an update after receiving a new table which indicates an association of the identifier of the network connection setting information with the identifier of the user information from the setting information distribution server 2, the right information distribution server 4, or the server having a function of distributing the user information and stores the new table in the information storage function 14. The table which indicates the association of the identifier of the network connection setting information with the identifier of the user information may be stored in the setting information distribution server 2, the right information distribution server 4, or another server, and the portable information terminal 1 may make an inquiry to a server storing the table which indicates the association of the identifier of the network connection setting information with the identifier of the user information, about the association of the identifier of the network connection setting information with the identifier of the user information.

The network connection setting information in this embodiment may contain authentication information, such as a password used to establish a connection with a communication network, in accordance with the necessity.

The portable information terminal 1 is installed with a network connection setting program. When the network connection setting program is executed, the portable information terminal 1 executes an information acquisition process to receive network connection setting information, which is information indicative of settings of connections with communication networks from the setting information distribution server 2 which distributes the network connection setting information, and executes a network connection process to establish the connection with the communication network on the basis of the received network connection setting information. In the network connection process, the communication network having an access point in the vicinity is scanned, and a network connection control process is executed to extract the communication network connectable to a computer on the basis of the received network connection setting information and the result of the scanning by the network connection process. In the network connection control process, screen information on a list of communication networks indicating the existence of the network connection setting information and the existence of the access point in the vicinity of the portable information terminal 1 is generated for the respective extracted communication networks. In the information acquisition process of the network connection process, screen information is generated so that the communication network for which the network connection setting information is not received is excluded. Moreover, in the information acquisition process of the network connection process, when the network connection setting information containing information on the name of the communication network is received, the communication network name is extracted from the network connection setting information.

Additionally, the network connection setting program installed onto the portable information terminal 1 causes the portable information terminal 1 to generate screen information on a list of the communication network names in the network connection process, after extracting the information on the communication network names, and to generate screen information on a list of communication networks the network connection control process so as to display the communication networks on the screen in descending order of the frequency of the connections with a computer or in descending order of the recency of the connections with the computer. When the screen information is generated in the network connection control process, a display control process is executed to display the screen information on the display means of the portable information terminal 1. In the display control process, information specifying the communication network to be connected is generated in accordance with a user operation, and a connection with the communication network is established in the network connection process in accordance with the information specifying the communication network to be connected. In the display control process, information to specifying another communication network to be connected is generated in accordance with a user operation while the connection with one communication network is kept established, and the connection with the one communication network is cut off in the network connection process to establish a connection with the other communication on the basis of the information specifying the other communication network to be connected. In the display control process, information indicating the cutoff of the connection with the communication network is generated in accordance with a user operation while the connection with the communication network is kept established, and the connection with the communication network is cut off in the network connection process on the basis of the information indicating the cutoff of the connection with the communication network, followed by execution of a network connection setting information storage process in the information acquisition process to store the network connection setting information received from the setting information distribution server 2 in the network connection setting information storage means which stores the network connection setting information.

The network connection setting program installed onto the portable information terminal 1 further causes the portable information terminal 1 to receive the network right information containing information indicating a right to establish a connection with the communication network from the right information server 4 which distributes the network right information in the information acquisition process. When the network right information is received from the right information distribution server 4 in the information acquisition process, the network connection setting information is received from the setting information distribution server 2. In the information acquisition process of the network connection process, the network connection setting information and the network right information are received, and the scanning is implemented. When the scan result indicates that there are multiple communication networks with an access point existing in the vicinity of the portable information terminal 1, a connection is established with the communication network with which the portable information terminal 1 is most frequently connected or the communication network terminal with which the portable information terminal 1 is most recently connected, and the network connection setting information and the network right information are received in the information acquisition process. On the other hand, when the scan result indicates that there is only a single communication network with an access point existing in the vicinity of the portable information terminal 1, a connection is established with this communication network, and screen information indicating the existence of the network connection setting information, the existence of the network right information, and the existence of the access point of the communication network in the vicinity of the portable information terminal 1 is generated for the respective communication networks on the basis of the network connection setting information, the network right information, and the scan result in the network connection control process. In the information acquisition process of the network connection process, screen information is generated so that the communication network for which either the network connection setting information or the network right information is not received is excluded. In the information acquisition process of the network connection process, when the network right information containing information on the communitarian network names is received, the communication network names from the network right information is extracted, and after the communication network name is extracted, screen information on a list of the communication network names is generated in the network connection process.

The network connection setting program installed onto the portable information terminal 1 also causes the portable information terminal 1 to receive the network connection setting information and the network right information in the information acquisition process of the network connection process, and when the scan result indicates that there is an access point of a communication network in the vicinity of the portable information terminal 1, the portable information terminal 1 is operated on the basis of an connection operation policy indicating to establish a connection with the communication network. In the information acquisition process of the network connection process, the network connection setting information and the network right information are received, and the scanning is implemented. When the scan result indicates that there are multiple communication networks with an access point existing in the vicinity of the portable information terminal 1, the network connection setting information and the network right information are received in the information acquisition process within the network connection process in which the portable information terminal 1 is operated on the basis of the connection operation policy indicating to establish a connection with the communication network with which the portable information terminal 1 is most frequently connected, or the communication network with which the portable information terminal 1 is most recently connected. On the other hand, when the scan result indicates that there are multiple communication networks with an access point existing in the vicinity of the portable information terminal 1, screen information on a list of the communication networks is generated in the network connection control process, and the communication network to be connected is selected by a user, so that a connection is established with the communication network selected by the user to receive the network connection setting information and the network right information in the information acquisition process. Furthermore, when the scan result indicates that there is only a single communication network with an access point existing in the vicinity of the portable information terminal 1, the portable information terminal 1 is operated on the basis of the connection operation policy indicating to establish a connection with the communication network, and the portable information terminal 1 is opera rated in the network connection control process and the network connection process on the basis of the connection operation policy corresponding to connection operation policy setting information which is information specifying the connection operation policy from among a plurality of the connection operation policies. Then, the connection operation policy setting information is changed by the information acquisition process in accordance with a user operation, an operation of a connected external instrument, and instructions via the communication network.

The network connection setting program installed onto the portable information terminal 1 further causes the portable information terminal 1 to execute a user information storage process to store user information, which is information specifying a user, in the user information storage means which stores the user information. Also, the network connection setting information is received in the information acquisition process of the network connection process, and the user information storage means stores the user information associated with the network connection setting information, followed by the scanning. If the scan result indicates that there are multiple communication networks with an access point existing in the vicinity of the portable information terminal 1, a connection is established with the communication network with which the portable information terminal 1 is most frequently connected or the communication network with which the portable information terminal 1 is most recently connected. On the other hand, when the scan result indicates that there is only a single communication network with an access point existing in the vicinity of the portable information terminal 1, a connection is established with the single communication network. In the network connection control process, screen information is generated indicating the existence of the network connection setting information, the existence of the association of the user information with the network connection setting information, and the existence of the access point of the communication network in the vicinity of the portable information terminal 1, on the basis of the network access information received in the information acquisition process, the user information stored in the user information storage means, and the result of the scan by the network connection means.

The network connection setting program installed onto the portable information terminal 1 also causes the portable information terminal 1 to execute a connection operation policy storage process to store a connection operation policy, which is information indicating an operation to establish a connection with the communication network in the storage means which stores the connection operation policy. In the information acquisition process of the network connection process, the network connection setting information is received, and the user information storage means stores the user information associated with the network connection setting information, followed by the scanning. If the scan result indicates that there is an access point of a communication network existing in the vicinity of the portable information terminal 1, the portable information terminal 1 is operated on the basis of the connection operation policy indicating to establish the connection with the communication network. On the other hand, when the result of the scan by the network connection means indicates that there are multiple of communication networks with an access point existing in the vicinity of the portable information terminal 1, the portable information terminal 1 is operated on the basis of the connection operation policy indicating to establish the communication network with which the portable information terminal 1 is most frequently connected or the communication network with which the portable information terminal 1 is most recently connected. In the information acquisition process of the network connection process, the network connection setting information is received, and the user information storage means stores the user information associated with the network connection setting information, followed by the scanning. If the scan result indicates that there are multiple communication networks with an access point existing in the vicinity of the portable information terminal 1, screen information on a list of the communication networks is generated in the network connection control process, and the communication network to be connected is selected by a user, so that the connection is established with the communication network selected by the user. On the other hand, when the scan result indicates that there is only a single communication network with an access point existing in the vicinity of the portable information terminal 1, the portable information terminal 1 is operated on the basis of the connection operation policy indicating to establish a connection with the single communication network. Then, a connection operation policy setting information storage process is implemented in which the plurality of the connection operation policies and connection operation policy setting information, which is information specifying the connection operation policy according which the portable information terminal 1 is operated are stored in the storage means, and the portable information terminal 1 is operated on the basis of the connection operation policy associated with the connection operation policy setting information, and in the connection operation policy setting information storage process, the connection operation policy setting information which is changed by a user operation, an operation of a connected external instrument, and the communication network is stored in the storage means.

Additionally, the network connection setting program installed onto the portable information terminal 1 further causes the portable information terminal 1 to execute an association storage process to store relation information indicating the association of the user information with the network connection setting information in the association storage means which stores the relation information. Also, the network connection setting information is received in the information acquisition process of the network connection process, and the user information storage means stores the user information indicating the association with the network connection setting information by the relation information, followed by the scanning. When the scan result indicates that there are multiple communication networks with an access point existing in the vicinity of the portable information terminal 1, a connection is established with the communication network with which the portable information terminal 1 is most frequently connected or the communication network with which the portable information terminal 1 is most recently connected. On the other hand, when the scan result indicates that there is a single communication network with an access point existing in the vicinity of the portable information terminal 1, a connection with the single communication network is established. In the network connection control process, screen information is generated indicating the existence of the network connection setting information, the existence of the association of the user information with the network connection setting information, and the existence of the access point of the communication network in the vicinity of the portable information terminal 1 with respect to the respective communication networks, on the basis of the network connection setting information received in the information acquisition process, the user information stored in the user information storage means, the relation information stored in the corresponding relationship storage means. In the information acquisition process of the network connection control process, screen information is generated so that the communication network for which the network connection setting information is not received or the communication network related to the network connection setting information which is not associated with the user information stored in the user information storage means.

Moreover, the network connection setting program installed onto the portable information terminal 1 causes the portable information terminal 1 to execute a connection operation policy storage process in which an connection operation policy, which is information indicating an operation to establish a connection with a communication network, is stored in the storage means which stores the connection operation policy. Then, in the connection operation policy storage process, the network connection setting information is received in the storage means, and the user information storage means stores user information indicating the association thereof with the network connection setting information by relation information, followed by the scanning. When the scan result indicates that there is an access point of a communication network existing in the vicinity of the portable information terminal 1, the connection operation policy indicating to establish the connection with the communication network is stored. Additionally, when the network connection setting information is received in the information acquisition process of the network connection process, and the user information storage means stores user information indicating the association thereof with the network connection setting information by relation information, and the scan result indicates that there are multiple communication networks with an access point existing in the vicinity of the portable information terminal 1, the portable information terminal 1 is operated on the basis of the connection operation policy indicating to establish a connection with the communication network with which the portable information terminal 1 is most frequently connected, or the communication network with which the portable information terminal 1 is most recently connected. Additionally, when the network connection setting information is received in the information acquisition process of the network connection process, and the user information storage means stores user information indicating the association thereof with the network connection setting information by relation information, and the scan result indicates that there are multiple communication networks with an access point existing in the vicinity of the portable information terminal 1, screen information on a list of the communication networks is generated in the network connection control process, and the communication network to be connected is selected by a user, so that the connection is established with the communication network selected by the user. When the network connection setting information is received in the information acquisition process, and the user information storage means stores user information indicating the association thereof with the network connection setting information by relation information, and the scan result indicates that only a single communication network with an access point existing in the vicinity of the portable information terminal 1, the portable information terminal 1 is operated on the basis of the connection operation policy indicating to establish a connection with the single communication network, and a connection operation policy setting information storage process is executed to store in the storage means a plurality of connection operation policies and connection operation policy setting information specifying the connection operation policy according to which the portable information terminal 1 is operated. Then, the portable information terminal 1 is operated on the basis of the connection operation policy in accordance with the connection operation policy setting information, and the connection policy setting information which is changed via a user operation, an operation of an accessed external instrument, or the communication network is stored in the storage means in the connection operation policy setting information storage process.

Furthermore, the network connection setting program installed onto the portable information terminal 1 causes the portable information terminal 1 to transmit information indicating the result of the scanning to the setting information distribution server 2 in the network connection process. Then, the network connection setting information associated with the scan result is received from the setting information distribution server 2 in the information acquisition process, and the user information containing information indicating the communication network associated with the user information is stored in the user information storage process. The network connection setting information related to the communication network associated with the user information is also received in the information acquisition process, and the user information containing information indicating the communication network associated with the user information is stored in the user information storage process. In the information acquisition process, the network connection setting information of the communication network to be connected access is received on the basis of the user information and the result of the scanning in the network connection process, and a table relating user information and access points of communication networks with network connection setting information is stored in the user information storage process. In the information acquisition process, the network connection setting information associated with the user information and the result of the scanning in the network connection process is also received on the basis of the table. Also, in the information acquisition process, the network right information containing information indicating the communication network associated with the network right information is received, and the network connection setting information of the communication network to be connected is received on the basis of the network right information and the result of the scanning in the network connection process, so that a table storage process is executed to store the table relating the network right information and the access points of the communication network with the network connection setting information. Moreover, in the information acquisition process, the network connection setting information associated with the network right information and the result of the scanning in the network connection process is received on the basis of the table stored in the table storage process.

The operation of the portable information terminal 1 in this embodiment is similar to the operation in the first embodiment and the operation in the second embodiment, and therefore the explanation thereof is omitted. The combination of this embodiment and the third embodiment is allowed, in which the user information is used in place of the network right information in the third embodiment when the portable information terminal 1 is connected with to the communication network. Also, the combination of this embodiment and the fourth embodiment is allowed in which an operation of establishing a connection with a communication network may be defined by the connection operation policy. This allows the portable information terminal 1 in this embodiment to perform the operation based on the respective connection operation policies exemplified in the fourth embodiment.

As described above, this embodiment provides the user information with an added value to allow establishing a connection with the communication network.

It should be noted that the setting information distribution server 2 may make an inquiry to the portable information terminal 1 whether or not the user information associated with the network connection setting information to be distributed is stored in the portable information terminal 1, before distributing the network connection setting information to the portable information terminal 1, and distributes the network connection setting information to the portable information terminal 1, when the portable information terminal 1 stores the user information associated with the network connection setting information to be distributed. This allows a company and a store or the like that issues the user information to provide the communication network connection service for only the user of the portable information terminal 1 for which the user information is prepared.

At this time, for example, the network connection setting information contains an identifier specifying the network connection setting information, and the user information contains an identifier specifying the user information and information on an identifier of the corresponding network connection setting information, and the network information contains an identifier specifying the associated communication network. This allows relating the network connection setting information, the user information and the network information with one another, by using the identifier of the network connection setting information, the identifier of the user information, and the identifier of the network information. Therefore, it is possible to specify the network connection setting information of the communication network associated with the user information and the network information.

Also, for example, the network connection setting information contains an identifier specifying the network connection setting information, and the user information contains an identifier specifying the user information and information on an identifier of the associated network connection setting information, and the network information contains an identifier specifying the associated communication network. Additionally, the information storage function 14 stores a table relating the identifiers with one another. This allows specifying the network connection setting information of the communication network associated with the user information and the network information on the basis of the table stored in the information storage function 14.

Further, for example, the setting information distribution server 2 stores a table relating the network information with the network connection setting information, and the network information contains information indicating the associated user information, and the portable information terminal 1 transmits, to the setting information distribution server 2, the network information associated with the user information stored in the information storage function 14. This allows the portable information terminal 1 to establish the connection with the communication network, after the setting information distribution server 2 distributes, to the portable information terminal 1, the network connection setting information associated the received network information on the basis of the stored table.

Moreover, for example, the setting information distribution server 2 stores a table relating the user information, the network information, and the network connection setting information with one another, and the portable information terminal 1 transmits the network information to the setting information distribution server. Then, the setting information distribution server 2 determines whether or not the information storage function 14 of the portable information terminal 1 stores the user information associated with the received network information on the basis of the stored table, and when the user information associated with the received network information is stored in the information storage function 14 of the portable information terminal 1, the user information stored in the information storage function 14 and the network connection setting information associated with the received network information are distributed to the portable information terminal 1. This allows the portable information terminal 1 to establish the connection with the communication network.

Furthermore, for example, the setting information distribution server 2 stores a table relating the user information, the network information, and the network connection setting information with one another and the portable information terminal 1 transmits the user information and the network information to the setting information distribution server. When the setting information distribution server 2 distributes, to the portable information terminal 1, the network connection setting information associated with the user information and the network information to be received on the basis of the stored table, this allows the portable information terminal 1 to establish the connection with the communication network.

In the above-described explanation, the fifth embodiment is explained as implementing an operation in which the network connection setting information is acquired in advance from the setting information distribution server 2 by issuing a request, as explained in the first embodiment. It would be easily understood by those skilled in the art that the fifth embodiment is applicable to an operation in which a request attached with the communication network information based on the scan result is issued to the setting information distribution server 2 to receive only the network connection setting information associated with the communication network indicated by the communication network information in the step of the connection setting process, as explained in the second embodiment referring to FIG. 9, or an operation in which a request further attached with information indicating the communication network associated with the network right information received from the right information distribution server 4 is issued to the setting information distribution server 2 to receive only the network connection setting information associated with the communication network which is indicated by the scan result and for which the network right information is prepared.

The present invention can be used for an information terminal which establishes a connection with a communication network via a public access point, as described above.

The invention claimed is:

1. An information terminal having a function of establishing a connection with a communication network, comprising:
   network connection means adapted to scan communication networks having an access point in the vicinity and to transmit a scan result to a setting information distribution server which distributes network connection setting information which is information indicative of settings of connections with communication networks;
   information acquisition means adapted to receive, from said setting information distribution server, the network connection setting information associated with the result of said scanning which is generated in said setting information distribution server;
   network connection control means adapted to generate display information of communication networks connectable with said information terminal on the basis of the network connection setting information received by said information acquisition means; and
   storage means storing a plurality of connection operation policies, which are information indicating a connection operation form predetermined for the information terminal itself, and connection operation policy setting information, which is information specifying the connection operation policy according to which said network connection control means and said network connection means are operated,
   wherein said network connection control means and said network connection means specify said connection operation policy setting information on the basis of one or more of network right information, said received network connection setting information and the result of the scanning by the network connection means, to operate on the basis of the connection operation policy in accordance with the specified connection operation policy setting information, and
   wherein the network connection setting information is transmitted to the information terminal by a communication device other than the access point.

2. An information terminal having a function of establishing a connection with a communication network, comprising:
   information acquisition means adapted to receive network right information from a right information distribution server which distributes said network right information, and to receive network connection setting information which is information indicative of settings of connections with communication networks from a setting information distribution server which distributes said network connection setting information, wherein said network right information specifies a communication network and a specific access point with which said information terminal only has a right to establish a connection;
   network connection means adapted to scan communication networks having an access point in the vicinity;
   network connection control means adapted to extract communication networks connectable with the information terminal on the basis of said network right information, said network connection setting information received by said information acquisition means, and a result of the scanning by said network connection means; and
   storage means storing a plurality of connection operation policies, which are information indicating a connection operation form predetermined for the information terminal itself, and connection operation policy setting information, which is information specifying the connection operation policy according to which said network connection control means and said network connection means are operated,
   wherein said network connection control means and said network connection means specify said connection operation policy setting information on the basis of one or more of said received network right information, said received network connection setting information and the result of the scanning by the network connection means, to operate on the basis of the connection operation policy in accordance with the specified connection operation policy setting information, and
   wherein the network right information is transmitted to the information terminal by a communication device other than the access point.

3. An information terminal having a function of establishing a connection with a communication network, comprising:
   network connection means adapted to scan communication networks having an access point in the vicinity and to transmit a result of said scanning to a setting information distribution server which distributes network connection setting information which is information indicative of settings of connections with communication networks, the result of the scan indicating at least one communication network detected by the scan;
   information acquisition means adapted to receive network right information from a right information distribution server which distributes said network right information and to receive, from said setting information distribution server, the network connection setting information associated with the result of said scanning generated in said setting information distribution server, wherein said network right information specifies a communication network and a specific access point with which said information terminal only has a right to establish a connection; and
   network connection control means adapted to generate display information of communication networks connectable with said information terminal on the basis of said network right information and said network connection setting information that are received by said information acquisition means; and
   storage means storing a plurality of connection operation policies, which are information indicating a connection operation form predetermined for the information terminal itself, and connection operation policy setting information, which is information specifying the connection operation policy according to which said network connection control means and said network connection means are operated,
   wherein said network connection control means and said network connection means specify said connection operation policy setting information on the basis of one or more of said received network right information, said received network connection setting information and the result of the scanning by the network connection means, to operate on the basis of the connection operation policy in accordance with the specified connection operation policy setting information, and
   wherein the network connection setting information and the network right information are transmitted to the information terminal by a communication device other than the access point.

4. An information terminal having a function of establishing a connection with a communication network, comprising:

network connection means adapted to scan communication networks having an access point in the vicinity and to output a result of said scanning;

user information storage means adapted to store user information identifying a user and containing information indicating a communication network associated with said user;

information acquisition means adapted to transmit said user information and the result of the scanning by the network connection means to a setting information distribution server which distributes network connection setting information which is information indicative of settings of connections with communication networks, and to receive the network connection setting information associated with said user information generated by said setting information distribution server and the result of said scanning from said setting information distribution server;

network connection control means adapted to generate display information of communication networks connectable with said information terminal on the basis of the network connection setting information received by said information acquisition means; and storage means storing a plurality of connection operation policies, which are information indicating a connection operation form predetermined for the information terminal itself, and connection operation policy setting information, which is information specifying the connection operation policy according to which said network connection control means and said network connection means are operated, wherein said network connection control means and said network connection means specify said connection operation policy setting information on the basis of one or more of network right information, said received network connection setting information and the result of the scanning by the network connection means, to operate on the basis of the connection operation policy in accordance with the specified connection operation policy setting information, and wherein the network connection setting information is transmitted to the information terminal by a communication device other than the access point.

5. The information terminal according to claim 2, wherein said network connection control means generates display information of said extracted connectable communication networks in a descending order of frequency of connections with said information terminal or in descending order of recency of date and time of connections with the information terminal.

6. The information terminal according to claim 2, further comprising:

display control means adapted to display on display means the communication networks connectable with said information terminal on the basis of said display information generated by said network connection control means, and to output information for specifying a communication network to be connected to said network connection control means in accordance with a user operation so as to instruct to establish a connection with the communication network.

7. A non-transitory recording medium which records a program that when executed controls an information terminal to perform a method comprising:

scanning the communication network having an access point in the vicinity;

transmitting a result of said scanning to a setting information distribution server which distributes network connection setting information, which is information indicative of settings of connections with communication networks;

receiving the network connection setting information associated with the result of said scanning generated by said setting information distribution server from said setting information distribution server;

generating display information of communication networks connectable with said information terminal on the basis of the network connection setting information received; and storing a plurality of connection operation policies, which are information indicating a connection operation form predetermined for an information terminal, and connection operation policy setting information, which is information specifying the connection operation policy according to which said network connection control process and said network connection process are executed, wherein in said scanning the communication network having an access point and said extracting communication networks connectable with an information terminal, said connection operation policy setting information is specified on the basis of one or more of network right information, said received network connection setting information, and the result of said scanning, and said scanning and said extracting are executed on the basis of the connection operation policy associated with said specified connection operation policy setting information, and wherein the network connection setting information is transmitted to the information terminal by a communication device other than the access point.

8. A non-transitory recording medium which records a program that when executed controls an information terminal to perform a method comprising:

receiving network right information from a right information distribution server which distributes said network right information, wherein said network right information specifies a communication network and a specific access point with which said information terminal only has a right to establish a connection;

receiving network connection setting information, which is information indicative of settings of connections with communication networks from a setting information distribution server which distributes said network connection setting information;

scanning communication networks having an access point in the vicinity;

extracting communication networks connectable with an information terminal on the basis of said network right information and said network connection setting information received in said information acquisition process and a result of the scanning of the communication networks; and storing a plurality of connection operation policies, which are information indicating a connection operation form predetermined for an information terminal, and connection operation policy setting information, which is information specifying the connection operation policy according to which said network connection control process and said network connection process are executed, wherein in said scanning the communication network having an access point and said extracting communication networks connectable with an information terminal, said connection operation policy setting information is specified on the basis of one or more of said received network right information, said received network connection setting information, and the result of said scanning, and said scanning and said extracting are executed on the basis of the connection operation policy associated with said specified connection operation policy setting information, and wherein the network right information is transmitted to the information terminal by a communication device other than the access point.

9. A non-transitory recording medium which records a program that when executed controls an information terminal to perform a method comprising:

scanning communication networks having an access point in the vicinity, a result of the scanning indicating at least one communication network detected by the scanning;

transmitting the result of said scanning to a setting information distribution server which distributes network distribution setting information, which is information indicative of settings of connections with communication networks;

receiving network right information from the right information distribution server which distributes said network right information, and of receiving, from said setting information distribution server, the network connection setting information associated with the result of said scanning generated in said setting information distribution server, wherein said network right information specifies a communication network and a specific access point with which said information terminal only has a right to establish a connection;

generating display information of communication networks connectable with said information terminal on the basis of said network right information and said network connection setting information received; and storing a plurality of connection operation policies, which are information indicating a connection operation form predetermined for an information terminal and connection operation policy setting information, which is information specifying the connection operation policy according to which said network connection control process and said network connection process are executed, wherein in said scanning the communication network having an access point and said extracting communication networks connectable with an information terminal, said connection operation policy setting information is specified on the basis of one or more of said received network right information, said received network connection setting information, and the result of said scanning, and said scanning and said extracting are executed on the basis of the connection operation policy associated with said specified connection operation policy setting information, and wherein the network connection setting information and the network right information are transmitted to the information terminal by a communication device other than the access point.

10. A non-transitory recording medium which records a program that when executed controls an information terminal to perform a method comprising:

scanning communication networks having an access point in the vicinity;

outputting a result of said scanning;

storing user information specifying a user and containing information indicating a communication network associated with said user;

transmitting the user information and the result of the scanning to a setting information distribution server which distributes network setting information which is information indicative of settings of connections with communication networks;

receiving, from said setting information distribution server, the network connection setting information associated with said user information and the result of said scanning, which is generated in said setting information distribution server;

generating display information of communication networks connectable with said information terminal on the basis of the network connection setting information received in said information acquisition process; and storing a plurality of connection operation policies, which are information indicating a connection operation form predetermined for an information terminal, and connection operation policy setting information, which is information specifying the connection operation policy according to which said network connection control process and said network connection process are executed, wherein in said scanning the communication network having an access point and said extracting communication networks connectable with an information terminal, said connection operation policy setting information is specified on the basis of one or more of network right information, said received network connection setting information, and the result of said scanning, and said scanning and said extracting are executed on the basis of the connection operation policy associated with said specified connection operation policy setting information, and wherein the network connection setting information is transmitted to the information terminal by a communication device other than the access point.

11. The non-transitory recording medium according to claim 8, further comprising:

generating display information of the extracted connectable communication networks in a descending order of the frequency of connections with said information terminal computer or in a descending order of the recency of date and time of connections with said information terminal.

12. The non-transitory recording medium according to claim 8, wherein said method further comprises:

generating display information of communication networks connectable with said information terminal;

displaying the communication networks connectable with said computer on the basis of said display information generated;

instructing to establish a connection with a communication network by outputting information specifying the communication network with which a connection is to be established to said network connection control process in accordance with a user operation.

13. A network connection setting method for allowing an information terminal to be connected with a communication network, said method comprising:

scanning communication networks having an access point in the vicinity;

transmitting a result of said scanning to a setting information distribution server which distributes network connection setting information, which is information indicative of settings of connections with communication networks;

receiving the network connection setting information associated with the result of said scanning and generated in said setting information distribution server from said setting information distribution server;

generating display information of communication networks connectable with an information terminal on the basis of said received network connection setting information;

storing a plurality of connection operation policies, which are information indicating a predetermined connection operation form, and information specifying the connection operation policy according to which said network connection control process and said network connection process are executed; and specifying said connection operation policy setting information on the basis of one or more of network right information, said received network connection setting information and the result of the scanning in said network connection process, wherein said network connection control process and said network connection process are performed on the basis of the connection operation policy associated with said specified connection operation policy setting information, and wherein the network connection setting information is transmitted to the information terminal by a communication device other than the access point.

14. A network connection setting method for allowing an information terminal to be connected with a communication network, said method comprising:

receiving network right information from a right information distribution server which distributes said network right information, wherein said network right information specifies a communication network and a specific access point with which said information terminal only has a right to establish a connection;

receiving network connection setting information, which is information indicative of settings of connections with communication networks from a setting information distribution server which distributes said network connection setting information;

scanning communication networks having an access point in the vicinity;

extracting communication networks connectable with said information terminal on the basis of said received network right information, said received network connection setting information, and a result of said scanning;

storing a plurality of connection operation policies, which are information indicating a predetermined connection operation form, and information specifying the connection operation policy according to which said network connection control process and said network connection process are executed; and specifying said connection operation policy setting information on the basis of one or more of said received network right information, said received network connection setting information and the result of the scanning in said network connection process, wherein said network connection control process and said network connection process are performed on the basis of the connection operation policy associated with said specified connection operation policy setting information, and wherein the network right information is transmitted to the information terminal by a communication device other than the access point.

15. A network connection setting method for allowing an information terminal to be connected with a communication network, said method comprising:

scanning communication networks having an access point in the vicinity, a result of the scanning indicating at least one communication network detected by the scanning;

transmitting the result of said scanning to a setting information distribution server which distributes network connection setting information, which is information indicative of settings of connections with communication networks;

receiving network right information from a right information distribution server which distributes said network right information, wherein said network right information specifies a communication network and a specific access point with which said information terminal only has a right to establish a connection;

receiving the network connection setting information associated with the result of said scanning and generated in the setting information distribution server from said setting information distribution server;

generating display information communication networks connectable with said information terminal on the basis of said received network right information and said received network connection setting information;

storing a plurality of connection operation policies, which are information indicating a predetermined connection operation form, and information specifying the connection operation policy according to which said network connection control process and said network connection process are executed; and specifying said connection operation policy setting information on the basis of one or more of said received network right information, said received network connection setting information and the result of the scanning in said network connection process, wherein said network connection control process and said network connection process are performed on the basis of the connection operation policy associated with said specified connection operation policy setting information, and wherein the network connection setting information and the network right information are transmitted to the information terminal by a communication device other than the access point.

16. A network connection setting method for allowing an information terminal to be connected with a communication network, said method comprising:

scanning communication networks having an access point in the vicinity;

storing user information specifying a user and containing information specifying a communication network associated with the user;

transmitting said stored user information and a result of the scanning to a setting information distribution server which distributes network connection setting information, which is setting information of establishing a connection with communication networks;

receiving the network connection setting information associated with said user information and the result of the scanning and generated in said setting information distribution server from said setting information distribution server;

generating display information communication networks connected with the information terminal on the basis of the received network connection setting information;

storing a plurality of connection operation policies, which are information indicating a predetermined connection operation form, and information specifying the connection operation policy according to which said network connection control process and said network connection process are executed; and specifying said connection operation policy setting information on the basis of one or more of network right information, said received network connection setting information and the result of the scanning in said network connection process, wherein said network connection control process and said network connection process are performed on the basis of the connection operation policy associated with said specified connection operation policy setting information, and wherein the network connection setting information is transmitted to the information terminal by a communication device other than the access point.

17. The network connection setting method according to claim 14, wherein the information about the communication networks connectable with the information terminal is displayed on the basis of the generated display information, and the information specifying the communication network to be connected is outputted in accordance with a user instruction so as to instruct to establish a connection with the communication network.

18. A network system in which an information terminal is connected with a communication network via an access point, said network system comprising:

a setting information distribution server adapted to store network connection setting information, which is information indicative of settings of connections with communication networks, so as to relate the network connection setting information with communication network information;

an information terminal adapted to scan communication networks having an access point in the vicinity, to transmit the communication network information based on a result of the scanning to said setting information distribution server, to receive the network connection setting information associated with the communication network information associated based on the result of the scanning, and generated in said setting information distribution server from said setting information distribution server, and to generate information for a screen display of the connectable communication networks on the basis of said received network connection setting information; and a right information distribution server which distributes network right information containing information indicating a right of establishing a connection with a communication network, wherein said information terminal is adapted to receive said network right information from said right information distribution server, to scan communication networks having an access point in the vicinity, to transmit communication network information based on the result of the scanning to the setting information distribution server, to receive the network connection setting information associated with the communication network information based on the result of the scanning, and generated in said setting information distribution server from said setting information distribution server, and to extract connectable communication networks on the basis of said received network right information and said received network connection setting information, wherein said information terminal is adapted to store a plurality of connection operation policies, which are information indicating a predetermined connection operation form, and to operate in accordance with the connection operation policy specified on the basis of one or more of said received network right information, said received network connection setting information, and the result of the scanning by said information terminal, and wherein the network connection setting information is transmitted to the information terminal by a communication device other than the access point.

19. A network system in which an information terminal is connected with a communication network via an access point, said network system comprising:

a setting information distribution server adapted to distribute network connection setting information which is information indicative of settings of connections with communication networks; and an information terminal adapted to receive the network connection setting information from said setting information distribution server, to scan communication networks having an access point in the vicinity, and to extract accessible communication networks on the basis of said received network connection setting information and a result of the scanning; and a right information distribution server which distributes network right information, wherein said network right information specifies a communication network and a specific access point with which said information terminal only has a right to establish a connection, wherein said information terminal is adapted to receive said network right information from said right information distribution server, to receive said network connection setting information from said setting information distribution server, to scan communication networks having an access point in the vicinity, and to extract connectable communication networks on the basis of said received network right information, said received network connection setting information and the result of the scanning, wherein said information terminal is adapted to store a plurality of connection operation policies, which are information indicating a predetermined connection operation form, and to operate in accordance with the connection operation policy specified on the basis of one or more of said received network right information, said received network connection setting information, and the result of the scanning by said information terminal, and wherein the network right information is transmitted to the information terminal by a communication device other than the access point.

20. The network system according to claim 18, wherein said setting information distribution server is adapted to store network connection setting information, which is information indicative of settings of connections with communication networks, relating user information specifying a user with communication network information specifying a communication networks, wherein said information terminal is adapted to scan communication networks having an access point in the vicinity, to transmit the stored user information and the result of said scanning to said setting information distribution server, to receive the network connection setting information associated with the user information and the result of said scanning and generated in the setting information distribution server from said setting information distribution server, and to generate display information of the connectable communication networks on the basis of said received network connection setting information.

21. The information terminal according to claim 2, wherein said network connection control means is adapted to generate display information of said extracted connectable communication networks.

22. The network connection setting method according to claim 14, further comprising: generating display information of said extracted connectable communication networks.

23. The network system according to claim 19, wherein said information terminal is adapted to generate display information of said extracted connectable communication networks.

24. The network system according to claim 18, wherein said information terminal is adapted to generate display information of said extracted connectable communication networks.

25. The information terminal according to claim 21, further comprising:
  display control means adapted to display the display information of said extracted connectable communication networks on display means of the information terminal, when said network connection control means generates the display information,
  wherein said display control means is adapted to, while a connection with one communication network is kept established, output information specifying another communication network to be connected, in response to a user operation;
  wherein said network connection control means is adapted to output the information specifying the other communication network to be connected to the network connection means, and
  wherein said network connection means is adapted to cut off the connection with said one communication network, and to establish a connection with the other communication network on the basis of the information specifying the other communication network to be connected.

26. The information terminal according to claim 21, further comprising:
  display control means adapted to display the display information of said extracted connectable communication networks on display means of the information terminal, when said network connection control means generates the display information,
  wherein said display control means is adapted to output information identifying a communication network to be connected in response to a user operation, and said network connection control means is adapted to output said information identifying the communication network to be connected to the network connection means,
  wherein said network connection means is adapted to establish a connection with the communication network on the basis of said information identifying the communication network to be connected,
  wherein said display control means is further adapted to, while a connection with one communication network is kept established, output information specifying another communication network to be connected, in response to a user operation;
  wherein said network connection control means is adapted to output the information specifying the other communication network to be connected to the network connection means, and
  wherein said network connection means is adapted to cut off the connection with said one communication network, and to establish a connection with the other communication network on the basis of the information specifying the other communication network to be connected.

27. The information terminal according to claim 21, further comprising:
  display control means adapted to display the display information of said extracted connectable communication networks on display means of the information terminal, when said network connection control means generates the display information,
  wherein said display control means is adapted to, while a connection with a communication network is kept established, output information indicating cutoff of the connection with said communication network in response to a user operation;
  wherein said network connection control means outputs the information indicating the cutoff of the connection with said communication network; and
  wherein said network connection means is adapted to cut off the connection with said communication network on the basis of the information indicating the cutoff of the connection with said communication network.

28. The information terminal according to claim 21, further comprising:
  display control means adapted to display the display information of said extracted connectable communication networks on display means of the information terminal, when said network connection control means generates the display information,
  wherein said display control means is adapted to output information identifying a communication network to be connected in response to a user operation, and said network connection control means is adapted to output said information identifying the communication network to be connected to the network connection means,
  wherein said network connection means is adapted to establish a connection with the communication network on the basis of said information identifying the communication network to be connected,
  wherein said display control means is further adapted to, while a connection with a communication network is kept established, output information indicating cutoff of the connection with said communication network in response to a user operation;
  wherein said network connection control means outputs the information indicating the cutoff of the connection with said communication network; and
  wherein said network connection means is adapted to cut off the connection with said communication network on the basis of the information indicating the cutoff of the connection with said communication network.

29. The recording medium according to claim 8, wherein said method further comprises:
  generating display information of said extracted connectable communication networks;
  displaying the display information on a display screen of the information terminal;
  generating information specifying another communication network to be connected in response to a user operation in said display control process, while a connection with one communication network is kept established;
  cutting off the connection with said one communication network is cut off; and
  establishing a connection with the other communication network on the basis of the information specifying the other communication network to be connected.

30. The recording medium according to claim 8, wherein said method further comprises:
- generating display information of said extracted connectable communication networks;
- displaying the display information on a display screen of the information terminal;
- generating information specifying a communication network to be connected in response to a user operation;
- establishing a connection with said specified communication network;
- generating information specifying another communication network to be connected in response to a user operation in said display control process, while a connection with one communication network is kept established;
- cutting off the connection with said one communication network; and
- establishing a connection with the other communication network on the basis of the information specifying the other communication network to be connected.

31. The non-transitory recording medium according to claim 8, wherein said method further comprises:
- generating display information of said extracted connectable communication networks;
- displaying display information of said extracted connectable communication networks on a display screen of the information terminal;
- generating, while a connection with a communication network is kept established, information indicating cutoff of the connection with said communication network in response to a user operation; and
- cutting off the connection with said communication network on the basis of the information indicating the cutoff of the connection with said communication network.

32. The non-transitory recording medium according to claim 8, wherein said method further comprises:
- generating display information of said extracted connectable communication networks;
- displaying display information of said extracted connectable communication networks on a display screen of the information terminal;
- generating information identifying a communication network to be connected in response to a user operation;
- establishing a connection with a communication network on the basis of said information identifying a communication network to be connected in the network connection process;
- generating, while a connection with a communication network is kept established, information indicating cutoff of the connection with said communication network in response to a user operation;
- cutting off the connection with said communication network on the basis of the information indicating the cutoff of the connection with said communication network, in the network connection process.

33. The network connection setting method according to claim 14, further comprising:
- generating display information of said extracted connectable communication networks;
- displaying the display information on a display screen of the information terminal;
- while a connection with a communication network is kept established, cutting off the connection with said communication network in response to a user operation to establish a connection with another communication network specified by a user.

34. The network connection setting method according to claim 14, further comprising:
- generating display information of said extracted connectable communication networks;
- displaying the displayed information on a display screen of the information terminal;
- establishing a connection with a communication network specified by a user;
- while a connection with one communication network is kept established, cutting off the connection with said one communication network in response to a user operation to establish a connection with another communication network specified by the user.

35. The network connection setting method according to claim 14, further comprising:
- generating display information of said extracted connectable communication networks;
- displaying the displayed information on a display screen of the information terminal;
- while a connection with a communication network specified by a user is kept established, cutting off the connection with said communication network specified by the user in response to a user operation.

36. The network connection setting method according to claim 14, further comprising:
- generating display information of said extracted connectable communication networks;
- displaying the displayed information on a display screen of the information terminal;
- establishing a connection with a communication network specified by a user;
- while the connection with said communication network specified by the user is kept established, cutting off the connection with said communication network specified by the user in response to a user operation.

37. The information terminal according to claim 2, wherein said network connection means establishes a connection between said information terminal and a selected communication network which is one of said communication networks extracted by said network connection control means, and
wherein said information acquisition means receives said network right information before said network connection means establishes said connection between said information terminal and said selected communication network.

38. The information terminal according to claim 2, wherein said setting information distribution server is a server provided separately from said right information distribution server.

39. The information terminal according to claim 2, wherein a public cell phone network, a wireless LAN or an infrared communication is used for a communication between said information acquisition means and said setting information distribution server.

40. The non-transitory recording medium according to claim 8, wherein said method further comprises:
- establishing a connection between said information terminal and a selected communication network which is one of said extracted communication networks,
- wherein said receiving said network right information is performed before said connection between said information terminal and said selected communication network is established.

41. The non-transitory recording medium according to claim 8, wherein said setting information distribution server is a server provided separately from said right information distribution server.

42. The non-transitory recording medium according to claim 8, wherein a public cell phone network, a wireless LAN or an infrared communication is used for a communication between said information terminal and said setting information distribution server.

43. The network connection setting method according to claim 14, further comprising:
establishing a connection between said information terminal and a selected communication network which is one of said extracted communication networks,
wherein said receiving the network connection setting information is performed before said connection between said information terminal and said selected communication network is established.

44. The network connection setting method according to claim 14, wherein said setting information distribution server is a server provided separately from said right information distribution server.

45. The network connection setting method according to claim 14, wherein a public cell phone network, a wireless LAN or an infrared communication is used for a communication between said information terminal and said setting information distribution server.

46. The network system according to claim 19, wherein said information terminal is adapted to establish a connection between said information terminal and a selected communication network which is one of said communication networks extracted, and
wherein said information terminal receives said network right information from said right information distribution server before establishing said connection between said information terminal and said selected communication network.

47. The network system according to claim 19, wherein said setting information distribution server is provided separately from said right information distribution server.

48. The network system according to claim 19, wherein a public cell phone network, a wireless LAN or an infrared communication is used for a communication between said information terminal and said setting information distribution server.

49. An information terminal having a function of establishing a connection with a communication network, comprising:
information acquisition means adapted to receive network connection setting information which is information indicative of settings of connections with communication networks from a setting information distribution server which distributes network connection setting information;
network connection means adapted to scan communication networks having an access point in a vicinity of said information terminal;
network connection control means adapted to establish a connection with a desired communication network;
control means adapted to instruct reception of said network connection setting information and to inform said network connection control means of said desired communication network selected out of said communication networks detected by the scanning; and
a right information distribution server which distributes network right information containing information indicating a right of establishing a connection with a communication network,
wherein said information terminal is adapted to receive said network right information from said right information distribution server, to scan communication networks having an access point in the vicinity, to transmit communication network information based on a result of the scanning to the setting information distribution server, to receive the network connection setting information associated with the communication network information based on the result of the scanning, and generated in said setting information distribution server from said setting information distribution server, and to extract connectable communication networks on the basis of said received network right information and said received network connection setting information,
wherein said information terminal is adapted to store a plurality of connection operation policies, which are information indicating a predetermined connection operation form, and to operate in accordance with the connection operation policy specified on the basis of one or more of said received network right information, said received network connection setting information, and the result of the scanning by said information terminal,
wherein, after the reception of said network connection setting information, said network connection control means establishes the connection with said desired communication network, based on said network connection setting information associated with said desired communication network, and
wherein the network connection setting information is transmitted to the information terminal by a communication device other than the access point.

50. A non-transitory recording medium storing a program which when executed controls an information terminal to execute a method comprising:
receiving network connection setting information which is information indicative of settings of connections with communication networks from a setting information distribution server which distributes network connection setting information;
scanning communication networks having an access point in a vicinity of said information terminal;
selecting a desired communication network from communication networks detected by said scanning;
establishing a connection between said information terminal said desired communication network;
receiving network right information containing information indicating a right of establishing a connection with a communication network from a right information distribution server;
transmitting communication network information based on a result of the scanning to the setting information distribution server;
receiving the network connection setting information associated with the communication network information based on the result of the scanning, and generated in said setting information distribution server from said setting information distribution server;
extracting connectable communication networks on the basis of said received network right information and said received network connection setting information;
storing a plurality of connection operation policies, which are information indicating a predetermined connection operation form; and
operating in accordance with the connection operation policy specified on the basis of one or more of said received network right information, said received network connection setting information, and the result of the scanning by said information terminal,
wherein the connection between said information terminal and said desired communication network is established based on said network connection setting information associated with said desired communication network, after said receiving said network connection setting information, and wherein the network connection setting information is transmitted to the information terminal by a communication device other than the access point.

51. A network connection setting method for allowing an information terminal to be connected with a communication network, said method comprising:

receiving network connection setting information which is information indicative of settings of connections with communication networks from a setting information distribution server which distributes network connection setting information;

scanning communication networks having an access point in a vicinity of said information terminal;

selecting a desired communication network from communication networks detected by said scanning;

establishing a connection between said information terminal said desired communication network;

receiving network right information containing information indicating a right of establishing a connection with a communication network from a right information distribution server;

transmitting communication network information based on a result of the scanning to the setting information distribution server;

receiving the network connection setting information associated with the communication network information based on the result of the scanning, and generated in said setting information distribution server from said setting information distribution server;

extracting connectable communication networks on the basis of said received network right information and said received network connection setting information;

storing a plurality of connection operation policies, which are information indicating a predetermined connection operation form; and operating in accordance with the connection operation policy specified on the basis of one or more of said received network right information, said received network connection setting information, and the result of the scanning by said information terminal, wherein the connection between said information terminal and said desired communication network is established based on said network connection setting information associated with said desired communication network, after said receiving said network connection setting information, and wherein the network connection setting information is transmitted to the information terminal by a communication device other than the access point.

52. A network system in which an information terminal is connected with a communication network via an access point, said network system comprising:

a setting information distribution server adapted to distribute network connection setting information which is information indicative of settings of connections with communication networks;

an information terminal adapted to receive said network connection setting information from said setting information distribution server, to scan communication networks having an access point in a vicinity of said information terminal, to select a desired communication network from communication networks detected by the scanning, and to establish a connection between said information terminal said desired communication network; and a right information distribution server which distributes network right information containing information indicating a right of establishing a connection with a communication network, wherein said information terminal is adapted to receive said network right information from said right information distribution server, to scan communication networks having an access point in the vicinity, to transmit communication network information based on a result of the scanning to the setting information distribution server, to receive the network connection setting information associated with the communication network information based on the result of the scanning, and generated in said setting information distribution server from said setting information distribution server, and to extract connectable communication networks on the basis of said received network right information and said received network connection setting information, wherein said information terminal is adapted to store a plurality of connection operation policies, which are information indicating a predetermined connection operation form, and to operate in accordance with the connection operation policy specified on the basis of one or more of said received network right information, said received network connection setting information, and the result of the scanning by said information terminal, wherein the connection between said information terminal and said desired communication network is established based on said network connection setting information associated with said desired communication network, after said receiving said network connection setting information, and wherein the network connection setting information is transmitted to the information terminal by a communication device other than the access point.

* * * * *

UNITED STATES PATENT AND TRADEMARK OFFICE
CERTIFICATE OF CORRECTION

PATENT NO. : 8,713,635 B2  Page 1 of 1
APPLICATION NO. : 11/570332
DATED : April 29, 2014
INVENTOR(S) : Norihisa Iga It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1543 days.

Signed and Sealed this

Twenty-ninth Day of September, 2015

Michelle K. Lee
*Director of the United States Patent and Trademark Office*